United States Patent [19]

Sánchez

[11] 4,358,822

[45] Nov. 9, 1982

[54] ADAPTIVE-PREDICTIVE CONTROL SYSTEM

[76] Inventor: Juan M. Sánchez, 317 8515 112 St., Edmonton, Alberta, Canada, T6G 1K7

[21] Appl. No.: 249,230

[22] Filed: Mar. 30, 1981

Related U.S. Application Data

[63] Continuation-in-part of Ser. No. 138,001, Apr. 7, 1980, abandoned, which is a continuation-in-part of Ser. No. 821,600, Aug. 4, 1977, Pat. No. 4,197,576.

[30] Foreign Application Priority Data

Aug. 4, 1976 [GB] United Kingdom ............... 32395/76

[51] Int. Cl.$^3$ ...................... G05B 13/04; G06F 15/46
[52] U.S. Cl. .................................... 364/151; 364/153; 364/158; 364/164; 364/178; 364/194; 364/501
[58] Field of Search ............... 364/105, 106, 116, 118, 364/108, 121, 501, 500, 502, 148–159, 164–165, 172, 178, 179, 194

[56] References Cited

U.S. PATENT DOCUMENTS

| | | | |
|---|---|---|---|
| 3,601,588 | 8/1971 | Bristol | 364/106 |
| 3,767,900 | 10/1973 | Chao et al. | 364/106 |
| 3,795,799 | 3/1974 | Courtiol | 364/106 |
| 3,876,871 | 4/1975 | Sinner | 364/106 |
| 3,920,965 | 11/1975 | Sohrwardy | 364/106 |

OTHER PUBLICATIONS

Richalet et al.–"Model Predictive Heristic Control: Applications to Industrial Processes"–Automatica, vol. 14, pp. 413–428–1978.
Richalet–"General Principles of Scenario Predictive Control Techniques"–Joint Automatic Control Conference–Aug. 13–15, 1980–San Francisco, Cal.
Mehra et al.–"Model Algorithmic Control: Theoretical Results on Robustness"–JACC–pp. 387–392–Jun. 1979.
Mehra et al.–"Model Algorithmic Control Using IDCOM for the F100 Jet Engine Multivariable Control Design Problem"–Int. Form on Alternatives for Multivariable Control, 1977–pp. 317–349.
Mehra et al.–"New Theoretical Developments in Multivariable Predictive Algorithmic Control"–Joint Automatic Control Conference–San Francisco, Cal.–1980.
Mehra et al.–"Theoretical Considerations on Model Algorithmic Control for Non–Minimum Phase Systems"–JACC–Aug. 1980.
Lebourgeois–"IDCOM Applications and Experiences on a PVC Production Plant"–JACC–Aug. 1980.
Engrand–"Applications of Multivariable Control in a Refinery and Implementation on a Dedicated Minicomputer–JACC–Aug. 1980.
Dachin–"Design Studies for the Automatic Piloting of the Tripartite Mine Hunter Boat"–JACC–Aug. 1980.
Reid et al.–"Output Predictive Algorithmic Control–Precision Tracking with Application to Terrain Following"–JACC–Aug. 1980.
Mehra et al.–"Model Algorithmic Control for Electric Power Plants"–IEEE Conf. on Decision and Control–Dec. 1980–pp. 280–285.
Control of Multivariable Systems with Unknown but Constant Parameters by V. Peterka and K. J. Astrom.

*Primary Examiner*—Joseph F. Ruggiero
*Attorney, Agent, or Firm*—Ostrolenk, Faber, Gerb & Soffen

[57] ABSTRACT

An adaptive-predictive control system for controlling single-input, single-output or multivariable time-variant processes with known or unknown parameters and with or without time delay, is disclosed. The adaptive-predictive control system of the present invention uses an adaptive-predictive model to determine what control vector should be applied to the processss being controlled to cause the process output to be at some desired value at a future time instant. The parameters of the adaptive-predictive model are updated on a real time basis in a manner which will cause the output vector predicted by the model to approach the actual process output vector.

20 Claims, 5 Drawing Figures

ADAPTIVE-PREDICTIVE CONTROL SYSTEM

RELATED APPLICATIONS

This application is a continuation-in-part of U.S. patent application Ser. No. 138,001, filed Apr. 7, 1980, which is a continuation-in-part of U.S. patent application Ser. No. 821,600, now U.S. Pat. No. 4,197,576 filed Aug. 4, 1977, both in the name of Juan Martin Sanchez.

BACKGROUND OF THE INVENTION

The invention is related to an adaptive control system for single-input single-output or multivariable time-variant processes with known or unknown parameters and with or without time delays. Such control systems are useful in many diverse fields such as aeronautics, electronics, chemical engineering, etc. Examples of processes in which the adaptive-predictive control system has been applied are single-input single-output control of an aircraft where the pitch angle is controlled by elevator position, and the multivariable control of a distillation column where top and bottom compositions are controlled by reflux and steam flow rates.

It is known that the control performance of a system with a control system based on constant parameters deteriorates when the dynamic parameters of the process vary in an unforeseen way which is not capable of direct or indirect measurement. In recent years, control techniques have been developed to try to solve this problem, the most noteworthy of which have been based on the model reference adaptive systems theory, which basically operates in one of the following ways: (1) performs a real time adaptive estimation of the parameters and state variables of the process, from which an adaptive regulator computes the control to be applied to the process, or (2) computes the control to be applied to the process through an adaptive control scheme in order to make the process output follow a model reference output. In general, in both of the above cases, the control structure requires the design of a corrector and the difficulties encountered in the computation of the parameters of this corrector as the order of the process increases, severely restricts the field of applications of these techniques.

The above considered techniques, as well as most of the adaptive or non-adaptive control techniques used so far in industry, are based in the traditional feedback methodology. According to this traditional methodology the control to be applied to the process is computed from the difference between a reference signal, which represents a desired value of the process output, and the process output. The present invention is able to overcome the above pointed out difficulties of known control techniques, acting in a way different from the traditional feedback methodology, and that is briefly described in the following.

BRIEF DESCRIPTION OF THE INVENTION

The present invention uses a digital computer (e.g., mini or micro computer) to accomplish the adaptive control of single-input single-output or multivariable time-variant processes with known or unknown parameters and with or without time delays, in such a way that the dynamic output vector of the process is predicted, using an adaptive-predictive model, and the control vector, to be applied to the process, is computed with the objective that the predicted dynamic output vector becomes equal to the desired dynamic output vector and with the further objective that the desired dynamic output vector and the control vector optimize a chosen performance criterion in which a future reference trajectory is considered. This is done at every sampling or control instant by a number of simple and specific operations.

The adaptive-predictive model can be updated at each sampling instant from the comparison of an estimated value of either an output vector, a control vector or a disturbance vector of the system being controlled, which vector is obtained with the use of the adaptive-predictive model, and the actual value of the corresponding output, control or disturbance vector. In the following description, the manner in which the adaptive-predictive model may be updated by comparing the estimated and actual value of the process output vector will be described first. Thereafter, the manner in which the model may be updated by comparing the estimated and actual values of a control or disturbance vector will also be described.

BRIEF DESCRIPTION OF THE DRAWINGS

For the purpose of illustrating the invention, there are shown in the drawings several embodiments which are presently preferred; it being understood, however, that this invention is not limited to the precise arrangements and instrumentalities shown.

DETAILED DESCRIPTION OF THE INVENTION

Figure 1:
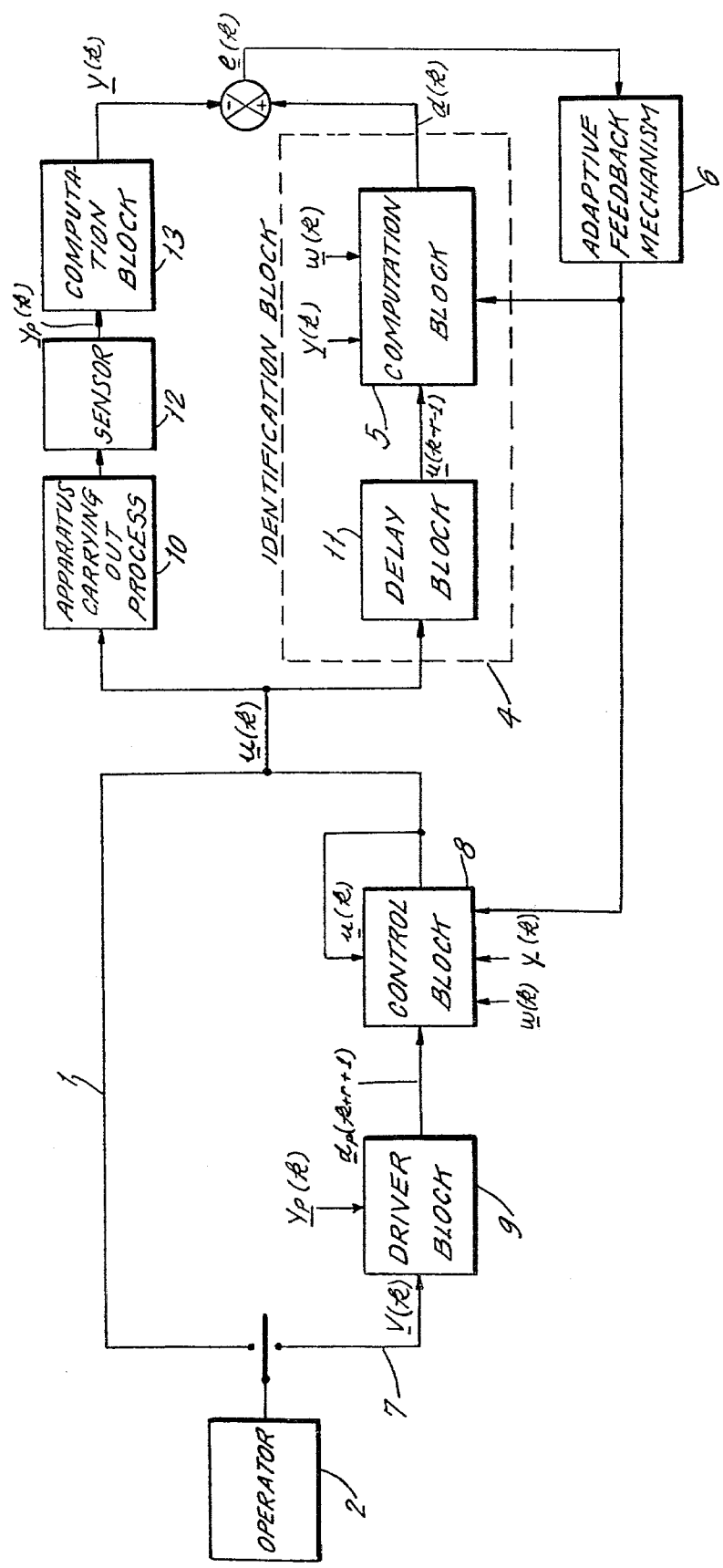
FIG. 1 shows the general and conceptual structure of the adaptive-predictive control system.

Referring now to the drawings, wherein like numerals indicate like elements, there is shown in FIG. 1 a block diagram which provides a pictorial representation of both the apparatus carrying out the process being controlled and the control system which controls the operation of the apparatus. It should be recognized, however, that various elements of this diagram do not necessarily represent physically separate entities but rather indicate the different functions which are carried out by a single digital computer. Of course, since different elements of the computer combine to carry out the different functions of the process, each element in FIG. 1 may properly be considered a separate means for carrying out the specified function.

At any sampling instant k, two modes of operation of the control system are possible; an identification mode and a control mode. Which mode is employed is determined by either a human or an automatic operator 2. In either case, the modes are as is shown in FIG. 1:

1. Identification mode:

In the identification mode, the control vector $u(k)$ is directly applied from the operator to both the apparatus 10 carrying out the process being controlled and the identification block 4 as shown by path 1. The identification block 4 uses an adaptive-predictive model stored in computation block 5 to compute a vector d(k), which vector can be an estimation of either an incremental process output vector y(k), an incremental control vector u(k) or an incremental measurable disturbance vector w(k). In a manner described below, the adaptive-predictive model may be updated in adaptive feedback mechanism 6 from the comparison of said vector d(k) and the actual value of the corresponding incremental output, control or disturbance vector, that the vector d(k) estimates. FIG. 1 shows the case in which the vector d(k) estimates an incremental output vector y(k) and is compared thereto.

2. Control mode:

In this mode, the parameters of the adaptive-predictive model are updated as explained above. However, as shown by path 7, the control vector u(k) to be applied to the apparatus 10 carrying out the process being controlled is computed by the control block 8. This computation of u(k) requires a previous selection in driver block 9 of a desired trajectory of the process output vector between sampling instants $k+r+1$ and $k+r+1+\lambda$, wherein k represents the present sampling instant, r represents a number of sampling instants in the future corresponding to the number of sampling time delays observed in the process or conveniently considered for control purposes (i.e. the number of sampling instants it takes for the process to respond to a change in the control vector minus 1) and $\lambda$ represents a positive integer or equal to zero. According to this nomenclature, $k+r+1$ represents $r+1$ sampling instants in the future while $k+r+1+\lambda$ represents $r+1+\lambda$ sampling instants in the future. Assuming that each sampling instant is, for example, two minutes apart, and that $r=3$ and $\lambda=1$, then the nomenclature $k+r+1$ represents that sampling instant which occurs eight minutes after the present sampling instant while the nomenclature $k+r+1+\lambda$ represents that sampling instant which occurs ten minutes in the future.

The desired process output trajectory is selected equal to that specific process output trajectory between sampling instants $k+r+1$ and $k+r+1+\lambda$, that the updated adaptive-predictive model used in identification block 4 predicts would be caused by a specific future control vector sequence between sampling instant k and $k+\lambda$, and such that the specific process output trajectory and the specific future control sequence optimize a chosen performance criterion in which a future reference trajectory is considered. Some examples of the chosen performance criterion and its optimization are set forth in detail in the description of operation (f) below. This chosen performance criterion is usually characterized by an index, and the optimization of the chosen performance criterion is obtained by minimizing the value of the index, which value can vary as a function of said future reference trajectory, the setpoint v(k) set by the operator 2, the measured and predicted process output and input sequences, the control constraints and any other paramemters or variables that may influence the control performance. Then, the computation of the control vector u(k) in control block 8, set forth in some detail in the description of the operation (g) below, obtains the value of u(k) which the adaptive-predictive model predicts will cause the process output to be equal to the value $d_p(k+r+1)$ of the desired process output trajectory at sampling instant $k+r+1$, and therefore the value of u(k) corresponds to the value at instant k of the future control sequence that optimizes the chosen performance criterion.

To properly control the process being carried out by apparatus 10, the adaptive-predictive control system uses incremental values of the output, input and measurable disturbance vectors of the process. Additionally, the control vector can be conveniently limit checked. The specific operations that the control system will carry out at every sampling instant k during the control mode are described as follows:

(a) Measurement by sensor 12, and, if it is considered convenient, filtering of the output variables of the process carried out by apparatus 10 to obtain the process output vector $y_p(k)$, the dimension of which is considered to be n.

The above considered filtering can be carried out by means of the well known filtering techniques presently available and/or through an appropriate weighted means between the measured values of said output variables and values of the output variables estimated using the adaptive-predictive model. The adaptive-predictive model, and the way in which it is used for estimation, is considered in operation (c) below.

(b) Computation of the incremental process output vector y(k) (in computer block 13) by:

$$y(k) = y_p(k) - y_p(k-\gamma) \tag{1}$$

where $\gamma$ is an integer that can be conveniently chosen. Each incremental process output vector y(k) is the difference between the value of the process output vector in the present sampling instant and the value of the process output vector in a predetermined prior sampling instant. $\gamma$ represents the number of sampling periods between the present sampling instant and the predetermined prior sampling instant.

(c) Computation (in identification block 4) of the estimated incremental process output vector d(k) by the adaptive-predictive model, which can be defined by:

$$d(k) = \sum_{i=1}^{h} A_i(k-1) y(k-i-r_1) + \sum_{i=1}^{f} B_i(k-1) u(k-i-r) + \sum_{i=1}^{g} C_i(k-1) w(k-i-r_2) \tag{2}$$

where the vectors u(k-i-r) and w(k-i-r$_2$) are obtained by:

$$u(k-i-r) = u_p(k-i-r) - u_p(k-i-r-\gamma) \tag{3}$$

$$w(k-i-r_2) = w_p(k-i-r_2) - w_p(k-i-r_2-\gamma) \tag{4}$$

where $u_p$(k-i-r) and $w_p$(k-i-r$_2$) are the control and the measurable disturbance vectors, respectively, of dimensions $n_1$ and m, at the sampling instants k-i-r and k-i-r$_2$, respectively. In equation (2), the integers h, f and g can be conveniently chosen, and likewise the integers r$_1$ and r$_2$ can also be conveniently chosen, taking into account the available or forecasted measurements of the output and disturbance vectors, respectively. The matrices $A_i(k-1)$, $B_i(k-1)$ and $C_i(k-1)$ of the adaptive-predictive model have appropriate dimensions and their values correspond to a past value before being updated at the instant k. If the dimension of the control vector is bigger than the dimension of the output vector then, in most of the cases, supplementary conditions should be added to obtain a unique control solution, or simply some of the control vector components can be included in the disturbance vector; as a particular case it will be considered that $n_1=n$. It must be understood that the measurable disturbance vector $w_p(k-i-r_2)$, or the incremental measurable disturbance vector $w(k-i-r_2)$, can be composed not only by variables which are usually considered as measurable disturbances, but by any kind of variable or functions of measurable variables that influence the process output vector at instant k. For instance, it can be considered that some of the components $w_{pj}(k)(j=1,g)$ of the vector $w_p(k)$ can be defined by:

$$w_{pj}(k) = \mu_{pm}(k) \cdot \nu_{pl}(k) \tag{5}$$

where $\mu_{pm}(k)$ and $\nu_{pl}(k)$ are respectively the m and l components of two measurable vectors $\mu_p(k)$ and $\nu_p(k)$. As a particular case these two vectors could be chosen:

$$\mu_p(k) = u_p(k) \tag{6}$$

$$\nu_p(k) = y_p(k) \tag{7}$$

Analogous equalities to (5), (6) and (7) can be assumed, as another particular case, for the increments, $w(k)$, $u(k)$ and $y(k)$, of the previously considered vectors $w_p(k)$, $u_p(k)$ and $y_p(k)$. The above example shows that the adaptive-predictive model presented under the form of equation (2) can be the result of a practical transformation from a more general class of non-linear models. Therefore, the adaptive-predictive control system can be applied being the adaptive-predictive model under the form of equation (2) but taken as starting point a non-linear model of the previously considered more general class or any other kind of model able to be transformed in a model of the form presented in equation (2).

(d) Computation of the incremental estimation error vector by:

$$e(k) = y(k) - d(k) \tag{8}$$

(e) Computation (in adaptive feedback mechanism 6) of the updated values at instant k of the parameters $a_{ijq}(k)$, $b_{ijq}(k)$ and $c_{ijq}(k)$, that are the elements in the jth row and qth column of the matrices $A_i(k)$, $B_i(k)$ and $C_i(k)$, respectively, by means of the following adaptive law:

$$a_{ijq}(k) = \beta_{aijq}(k) a_j(k) e_j(k) y_q(k-i-r_1) + a_{ijq}(k-1) \tag{9}$$

$$b_{ijq}(k) = \beta_{bijq}(k) a_j(k) e_j(k) u_q(k-i-r) + b_{ijq}(k-1) \tag{10}$$

$$c_{ijq}(k) = \beta_{cijq}(k) e_j(k) w_q(k-i-r_2) + c_{ijq}(k-1) \tag{11}$$

where $e_j(k)$, $y_q(k-i-r_1)$, $u_q(k-i-r)$ and $w_q(k-i-r_2)$ are the corresponding components of the vectors $e(k)$, $y(k-i-r_1)$, $u(k-i-r)$ and $w(k-i-r_2)$, respectively. $\beta_{aijq}(k)$, $\beta_{bijq}(k)$ and $\beta_{cijq}(k)$ and $a_j(k)$ are time-variant coefficients or functions that can be easily chosen among the wide range of possibilities that the well known gradient parameter, or least squares, identification techniques permit. One possible choice is these coefficients or functions can be the following:

$$a_j(k) = 1 / \left[ 1 + \sum_{i=1}^{h} \sum_{q=1}^{n} \beta_{aijq}(k) y_q(k-i-r_1)^2 + \right. \tag{12}$$

$$\left. \sum_{i=1}^{\ell} \sum_{q=1}^{n} \beta_{bijq}(k) u_q(k-i-r)^2 + \sum_{i=1}^{g} \sum_{q=1}^{m} \beta_{cijq}(k) w_q(k-i-r_2)^2 \right]$$

$$\beta_{aijq}(k) = \beta_{aijqp} |a_{ijq}(k-1)| \tag{13}$$

$$\beta_{bijq}(k) = \beta_{bijqp} |b_{ijq}(k-1)| \tag{14}$$

$$\beta_{cijq}(k) = \beta_{cijqp} |c_{ijq}(k-1)| \tag{15}$$

where $|a_{ijq}(k-1)|$, $|b_{ijq}(k-1)|$ and $|c_{ijq}(k-1)|$ are the absolute values of the corresponding parameter values $a_{ijq}(k-1)$, $b_{ijq}(k-1)$ and $c_{ijq}(k-1)$; and $\beta_{aijqp}$, $\beta_{bijqp}$ and $\beta_{cijqp}$ are coefficients that can be conveniently chosen, for example, taking into account the expected variations of the previously mentioned corresponding parameters during the adaptive-predictive control system operations and the noises acting on the system.

(f) Through a particular design of the driver block 9, when $\lambda = 0$, the desired process output vector $d_p(k+r+1)$ and the desired increment process output vector $d_i(k+r+1)$ can be computed as follows:

1. Computation of the desired process output vector $d_p(k+r+1)$ of dimension $(n \times 1)$ which can be done in various ways, such as using a model reference with desired dynamics or using any other design which will take into account the desired dynamics and also the previously measured or forcasted process outputs. An example of this last type of design can be defined by the following equation:

$$d_p(k+r+1) = \sum_{i=1}^{t} F_i y_p(k+r+1-r_1-i) + \tag{16}$$

$$\sum_{i=1}^{s} H_i v(k+1-i)$$

where $y_p(k+r+1-r_1-i)$ and $v(k+1-i)$ are the process output vector and the driver block input vector at the sampling instant $k+r+1-r_1-i$ and $k+1-i$, respectively. $v(k+1-i)$ is a vector of dimension n, that is generated directly by the operator; and the matrices $F_i(i=1,t)$ and $H_j(j=1,s)$, as well as the integers t and s, can be chosen freely, to take into account the desired dynamics (i.e. to define the desired dynamics). An illustration of this choise is given in the Experimental Example 1 below.

2. From the value of the desired output vector of the process $d_p(k+r+1)$, the desired incremental output vector $d_i(k+r+1)$ can be easily computed or defined in various manners; a particular one, usually convenient when $\gamma > r$, is given by the following equation:

$$d_i(k+r+1) = d_p(k+r+1) - y_p(k+r+1-\gamma) \tag{17}$$

If found necessary the value of $d_i(k+r+1)$ can be limit checked.

The foregoing computations of the desired output vector $d_p(k+r+1)$ and the desired incremental output vector $d_i(k+r+1)$, can be performed by expressing the vectors $y_p(k+r+1-r_1-i)$, $v(k+1-i)$ and $y_p(k+r+1-\gamma)$ as increments with respect to a predetermined constant or time variant vector. If the time variant vector is chosen to be equal to the set point vector, v(k), the solution of equation (16) can be simplified.

A more general design of the driver block 9 can be considered as follows:

At each sampling instant k, the driver block 9 selects a desired dynamic process output trajectory between sampling instants $k+r+1$ and $k+r+1+\lambda$, with $\lambda \geq 0$, said desired trajectory being equal to a specific process output trajectory between sampling instants $k+r+1$ and $k+r+1+\lambda$, that the adaptive-predictive model predicts would be caused by a specific further sequence of control vectors between sampling instants k and $k+\lambda$, and such that the specific process output trajectory and the specific future control vector sequence optimize a chosen performance criterion in which a future reference trajectory is considered. The optimization can be obtained through the minimization of a certain index, I, which characterizes the selected performance criterion.

By way of example, the index I may vary as a function of the difference between said future reference trajectory and a process output trajectory between instants $k+r+1$ and $k+r+1+\lambda$, that the adaptive-predictive model predicts would be caused by a future control sequence between instants k and $k+\lambda$, and also as a function of the future control sequence:

$$I = \sum_{h=k+r+1}^{k+r+1+\lambda} [y_p'(h) - y_r(h)]' M(h-k) [y_p'(h) - y_r(h)] + \sum_{h=k}^{k+\lambda} [u_p'(h) - u_p'(h-\sigma)]' N(h-k) [u_p'(h) - u_p'(h-\sigma)] \quad (18)$$

wherein $y_p'(h)$ and $u_p'(h)$ are the values of the predicted output trajectory and of the corresponding sequence of control vectors, respectively, $M(h-k)$ and $N(h-k)$ are non-negative real matrices which may be conveniently chosen and which serve as weighted coefficients for the vector multiplication, $\sigma$ is an integer that can be conveniently chosen, and reference trajectory $y_r(h)$ can be defined by:

$$y_r(h) = \sum_{i=1}^{t} F_i y_r(h-i) - \sum_{i=1}^{s} H_i v(h-i-r) \quad (18A)$$

$$h = k+1, k+r+1+\lambda$$

where:

$$y_r(h) = y_p(h) \quad (18B)$$

$$h = k+1-t, k$$

$$v(h) = v(k) \quad (18C)$$

$$h = k+1, k+\lambda$$

and $$u_p'(h-\sigma) = u_p(h-\sigma) \quad (18D)$$

$$h = k, k+\sigma-1$$

This index considers the precited output and control vector sequences over an interval of optimization of $\lambda+1$ future sampling instants, contains weighting matrices $M(h-K)$ and $N(h-K)$, the value of which can be selected differently for each future sampling instant of said interval of optimization, and takes into account a desired dynamic behavior of the process output through the consideration of a reference trajectory, which is redefined at every instant k as a function of the previously measured process output. The desired dynamics are defined by $F_i$ and $H_i$ in Equation (18A).

If this index is minimized, the difference between the desired output trajectory and the reference trajectory which takes into account the desired dynamics will be minimized and the size of the predicted incremental control vector will also be minimized. This will result in a more stable control. Such stability is particularly desirable in applications where the process behaves as a non-minimum phase system, which would require large or unbounded controls in order to cause the process output to follow a reference trajectory having the desired dynamics.

In the adaptive predictive control system of the present invention examples of particular cases of the previously considered index, giving particular values to the integer $\lambda$ and to the weighting matrices $M(h-K)$ and $N(h-K)$ are presented in the following. In these particular cases, the optimization problem can be solved in a simple manner, which does not require complex computations such as those required for the solution of a Ricatti equation.

One of these particular cases is the following second index:

$$I = y_p'(k+r+1) - \sum_{i=1}^{t} F_i y_p(k+r+1-r_1-i) - \sum_{i=1}^{s} H_i v(k+1-i) \quad (19)$$

wherein $u_p(k)$ is included in $U^n$ and $u(k)$ is included in $U_i{}^n$ and $U^n$ and $U_i{}^n$ are respectively the domains of control vectors and incremental control vectors compatible with the control constraints. Note that this second index is a particular case of the first one in which $\lambda$ is equal to zero, $N(0)$ is also identical to zero, the reference trajectory at $k+r+1$, $y_r(k+r+1)$, is defined by the right hand side of equation (16), and control constraints are taken into consideration. It can also be observed that, in the case of the absence of control constraints, the minimization of the index defined by (19) will lead to a driver block equivalent to the one defined by equation (16). The computation of the control vector u(k) which minimizes index (19) is considered in the description of operation (g) below.

Another example of a particular case of the first index above considered is the following third index:

$$I = [y_p'(k+r+1+\lambda) - y_r(k+r+1+\lambda)]' M(r+1+\lambda) [y_p'(k+r+1+\lambda) - y_r(k+r+1+\lambda)] + \sum_{h=k+1}^{k+\lambda} [u_p'(h) - u_p'(h-1)]' N(h-k) [u_p'(h) - u_p'(h-1)] \quad (20)$$

where $\lambda$ is a positive integer conveniently chosen and $y_r(k+r+1+\lambda)$ can be defined by an equation such as (18A).

The index defined by equation (20) will be minimized if the future predicted control sequence from instant k to instant $k+\lambda$ is constant, and the value $y_p'(k+r+1+\lambda)$ of the predicted output trajectory is equal to the value of the reference trajectory $y_r(k+r+1+\lambda)$; that is to say:

$$u'_p(h) = u'_p(h-1) \quad h = k+1, k+\lambda \qquad (21)$$

$$y'_p(k+r+1+\lambda) = y_r(k+r+1+\lambda) \qquad (22)$$

Consequently, the vector of the desired output trajectory at $k+r+1+\lambda$, $d_p(k+r+1+\lambda)$, will be given by:

$$d_p(k+r+1+\lambda) = y_r(k+r+1+\lambda) \qquad (23)$$

This index is a particular case of the first considered index, in which all the $M(h-k)$ except $M(r+1+\lambda)$ are identical to zero; all the $N(h-k)$ are positive definite except $N(0)$ which is identical to zero, $\sigma$ is equal to 1 and $\lambda$ is a positive integer.

From the value of the desired output vector of the process $d_p(k+r+1+\lambda)$, the desired incremental output vector $d_i(k+r+1+\lambda)$, with $\lambda > 0$, can be computed or defined in various manners, a particular one usually convenient when $\gamma > r+\lambda$ is given by the following equation:

$$d_i(k+r+1+\lambda) = d_p(k+r+1+\lambda) - y_p(k+r+1+\lambda - \gamma) \qquad (24)$$

The explicit computation of $u_p(k)$, considered in operation (g) below can in this case be performed from $d_i(k+r+1+\lambda)$, taking into account conditions (21), which minimize the index defined by equation (20). In almost all cases, it is convenient to limit check the desired increment $d_i(k+r+1+\lambda)$. An illustrative experimental sample of this kind of driver block is presented below under experimental example 2.

While by way of example a first general index has been shown, which admits particular cases in which, through an appropriate choice of the weighting matrices, the optimization problem can be solved in a simple manner, it should be recognized that other general indices can in a similar way be developed. These other indices can be selected as a function of the reference trajectory, the setpoint, the measured and predicted output and input sequences, the control constraints, and any other parameters or variables that may influence the control performance.

(g) The computation of the control vector in control block 8 is intimately related to the above considered operation (f). In fact operation (f) determines at least implicitly the value of the control vector at instant k, since the control vector corresponds to the value at instant k of the predicted control sequence that minimizes the index defined in operation (f). This is equivalent to say that the control vector at instant k is the one that makes the predicted process output at instant $k+r+1$ equal to the value of the desired process output trajectory at the same future instant $k+r+1$. Therefore, in general, the explicit computation of the control vector at instant k can be made, using the adaptive-predictive model, from the value of the desired output trajectory at instant $k+r+1$, $d_p(k+r+1)$. Particularly, in the case in which the performance index is defined by (19), and integers $\gamma$, $r_1$ and $r_2$ are chosen such that $\gamma > r$, $r_1 \geq r$ and $r_2 \geq r$, the considered explicit computation may be carried out according to the following:

1. The predicted incremental process output vector $y'(k+r+1)$ at the sampling instant $k+r+1$, is defined by:

$$y'(k+r+1) = y'_p(k+r+1) - y_p(k+r+1-\gamma) \qquad (25)$$

From the updated adaptive-predictive model (updated by the output of adaptive feedback mechanism 6), the predicted incremental process output vector $y'(k+r+1)$ will depend upon the incremental control vector $u(k)$, and is given by the equation:

$$y'(k+r+1) = \sum_{i=1}^{h} A_i(k) y(k+r+1-r_1-i) + \sum_{i=1}^{f} B_i(k) u(k+1-i) + \sum_{i=1}^{g} C_i(k) w(k+r+1-r_2-i) \qquad (26)$$

2. The value of the control vector which minimizes the index defined by (19), can be obtained, appropriately limit checking the value of the control vector which minimizes index (19) in the absence of control constraints. In this last case of absence of control constraints, the value of the desired output trajectory at instant $k+r+1$, $d_p(k+r+1)$, is given by equation (16), the corresponding desired increment $d_1(k+r+1)$ by equation (17), and the incremental control vector $u(k)$ which makes the predicted incremental process output vector $y'(k+r+1)$ equal to $d_1(k+r+1)$, i.e. $y'_p(k+r+1) = d_p(k+r+1)$, is given by:

$$u(k) = B_1(k)^{-1} d_1(k+r+1) - B_1(k)^{-1} \sum_{i=2}^{f} B_i(k) u(k+1-i) - B_1(k)^{-1} \sum_{i=1}^{h} A_i(k) y(k+r+1-r_1-i) - B_1(k)^{-1} \sum_{i=1}^{g} C_i(k) w(k+r+1-r_2-i) \qquad (27)$$

In the case in which the control vector must verify conditions such as the ones expressed by equations (5), (6) and (7), these conditions will be taken into account in the computation of $u(k)$ by equation (27). The value of $u_p(k)$, which minimizes index (19) in the absence of control constraints, can be obtained, from the value of $u(k)$ computed by equation (27), by means of the equation:

$$u_p(k) = u(k) + u_p(k-\gamma) \qquad (28)$$

The value of $u_p(k)$ that minimizes index (19) can be finally obtained by appropriately limit checking the absolute and incremental value of $u_p(k)$ previously obtained by equation (28). It can be noted that, in this case, the computation of $u_p(k)$ does not require an explicit computation of the value at instant $k+r+1$ of the desired output trajectory which minimizes index (19).

In the case in which the index considered in operation (f) is the one defined by equation (20), and integers $\gamma$, $r_1$ and $r_2$ are chosen such that $\gamma > r+\lambda$, $r_1 \geq r+\lambda$ and $r_2 \geq r+\lambda$, the computation of $u(k)$, and therefore the computation of $u_p(k)$, can be performed from the desired incremental value $d_1(k+r+1+\lambda)$, defined by equation (24), according to the following:

1. The predicted incremental process output vector $y'(k+r+1)$ can be defined by:

$$y'(k+r+1+\lambda) = y'_p(k+r+1+\lambda) - y_p(k+r+1+\lambda-\gamma) \qquad (29)$$

From the updated adaptive-predictive model, the predicted incremental process output vector $y'(k+r+1+\lambda)$ will depend upon the incremental control vector u(k), and is given by the equation:

$$y'(k+r+1+\lambda) = \sum_{i=1}^{h} A_i(k) y(k+r+1+\lambda-r_1-i) + \quad (30)$$

$$\sum_{i=1}^{f} B_i(k) u(k+1+\lambda-i) +$$

$$\sum_{i=1}^{g} C_i(k) w(k+r+1+\lambda-r_2-i)$$

Taking into account equations (3) and (28), and conditions (21), equation (30) can be written in the form:

$$y'(k+r+1+\lambda) = \sum_{i=1}^{h} A_i(k) y(k+r+1+\lambda-r_1-i) + \quad (31)$$

$$\sum_{i=1}^{g} C_i(k) w(k+r+1+\lambda-r_2-i) +$$

$$\sum_{i=1}^{f} B_i(k) (u(k) + u_p(k-\gamma) - u_p(k+1+\lambda-i-\gamma)) +$$

$$\sum_{i=\lambda+2}^{f} B_i(k) u(k+1+\lambda-i)$$

In equation (31), when f is bigger than $\lambda$, f' will be equal to $\lambda+1$, and when f is less or equal to $\lambda$, f' will be equal to f and then the last summation of the right hand side of this equation will not appear.

2. The incremental control vector u(k) is computed in this case by making the predicted incremental process output vector $y'(k+r+1+\lambda)$ equal to the desired incremental output $d_1(k+r+1+\lambda)$, and is given by:

$$u(k) = \left( \sum_{i=1}^{\lambda+1} B_i(k) \right)^{-1} \Bigg[ d_1(k+r+1+\lambda) - \quad (32)$$

$$\sum_{i=1}^{h} A_i(k) y(k+r+1+\lambda-r_1-i) -$$

$$\sum_{i=1}^{g} C_i(k) w(k+r+1+\lambda-r_2-i) -$$

$$\sum_{i=1}^{f} B_i(k)(u_p(k-\gamma) - u_p(k+1+\lambda-i-\gamma)) -$$

$$\sum_{i=\lambda+2}^{f} B_i(k) u(k+1+\lambda-i) \Bigg]$$

The value of f' and the last summation in the brackets of equation (32), are as previously considered in equation (31).

In the case in which the control vector must verify conditions such as the ones expressed by equations (5), (6) and (7), these conditions will be taken into account in the computation of u(k) by equation (32).

The value of $u_p(k)$ that minimizes (20) can be obtained, from the value of u(k) computed by equation (32), by means of equation (28).

The previously considered computations of the control vector are illustrated below under Experimental Examples 1 and 2, respectively.

In the above two examples of minimizations of an index, it has been considered that integer $\gamma$, $r_1$ and $r_2$ are chosen such that $\gamma > r+\lambda$, $r_1 \geq r+\lambda$ and $r_2 \geq r+\lambda$, being $\lambda \geq 0$. This choice allows the computation of the control vector directly from a desired value of the process output and other previously measured process output, input and measurable disturbance vectors, using the adaptive-predictive model. In general, integers $\gamma$, $r_1$ and $r_2$ can be chosen such that $\gamma \geq 1$, $r_1 \geq 0$ and $r_2 \geq 0$. However, in the case in which $\gamma \leq r+\lambda$ or $r_1 < r+\lambda$ or $r_2 < r+\lambda$, the previously considered equations (25), (26), (29), (30) and (31) are still valid considering that the values or incremental values of the process output, input and measurable disturbance vectors contained in these equations and not measured yet at instant k, must be substituted by their corresponding predicted or estimated values. Therefore, in this case, the computation of the control vector, which will make $y'_p(k+r+1+\lambda) = d_p(k+r+1+\lambda)$, $\lambda \geq 0$, must take into account, using appropriately the adaptive-predictive model, the intermediate computation of said predicted or estimated values. In addition, the computation of the control vector will have to satisfy conditions such as (5), (6) and (7), if they exist. This manner of computing u(k) does not present conceptual or practical difficulties and it is used in the program example set forth below.

(h) In most cases, the control vector $u_p(k)$ and its increments will be conveniently limit checked before being applied to the process.

In its implementation, the adaptive-predictive control system can use incremental input, output and disturbance vectors as described in the above operations. An alternative method of implemeting the system is to compute the incremental input, output and disturbance vectors with respect to some constant vectors chosen conveniently and, consequently, in the exemplary equations described above, the equations (1), (25), (29), (3), (4), (11), (24) and (28) need to be respectively modified as follows:

$$y(k) = y_p(k) - y_{pc} \quad (33)$$

$$y'(k+r+1) = y'_p(k+r+1) - y_{pc} \quad (34)$$

$$y'(k+r+1+\lambda) = y'_p(k+r+1+\lambda) - y_{pc} \quad (35)$$

$$u(k-i-r) = u_p(k-i-r) - u_{pc} \quad (36)$$

$$w(k-i-r_2) = w_p(k-i-r_2) - w_{pc} \quad (37)$$

$$d_1(k+r+1) = d_p(k+r+1) - y_{pc} \quad (38)$$

$$d_1(k+r+1+\lambda) = d_p(k+r+1+\lambda) - y_{pc} \quad (39)$$

$$u_p(k) = u(k) + u_{pc} \quad (40)$$

Likewise, when it is considered convenient to give specific values to some of the adaptive-predictive model parameters (for instance, because of a certain knowledge of the process), these values can be given to the respective parameters, and the corresponding $\beta$ coefficients will be set to zero. Also it is possible to stop the updating operations of the adaptive-predictive model parameters as long as it is considered convenient.

When the system performs in its identification mode, it only needs to carry out the operations (a) to (e), and this identification action can be performed in real time or off-line, and even in between the sampling intervals.

It will be observed that in the operation (g), equation (27) the matrix $B_1(k)$ must be inverted to compute u(k). The risk of singularity of the matrix $B_1(k)$, and in general the risk of inversion of a singular matrix in the computation of u(k), can almost always be avoided by adding time delays to the components of the input and output process vectors, and controlling the resultant process. An illustrative experimental example of this procedure is presented below under Experimental Example 1.

In the foregoing description, the adaptive-predictive model is updated in accordance with equations (9)–(15). These equations are a particular case of a more general adaptive law, which law falls within the gradient parameter identification technique, and which permits the matrices to be updated in a manner which causes the estimated output vector to approach the actual output vector. Before setting forth this more general adaptive law (remembering that any appropriate law falling within the gradient parameter, or least squares, identification technique can be used), it is helpful to reexpress the adaptive-predicitive model of equation (2) in a simpler form.

As set forth in equation (2), the adaptive-predictive model includes matrices $A_i(k-1)$ ($i=1,h$), $B_i(k-1)$ ($i=1, f$), and $C_i(k-1)$ ($i=1, g$) and systems vectors $y(k-i-r_1)$ ($i=1, h$), $u(k-i-r)$ ($i=1, f$), and $w(k-i-r_2)$ ($i=1, g$). Alternatively, equation (2) and therefore the adaptive-predictive model may be expressed as follows:

$$d(k) = \theta(k-1)x(k) \quad (41)$$

where in $\theta(k-1)$ is a matrix composed of the matrices of equation (2) and $x(k)$ is a vector composed of the vectors of the right hand side of equation (2). Each row $j$ of the matrix $\theta(k)$ [$\theta(k-1)$ being the value of $\theta$ at the sampling instant $k-1$]corresponds to a vector $\theta_j(k)$ ($j=1, n$), the components of which are the parameters $a_{ijq}(k)$ ($i=1,h; q=1,n$), $b_{ijq}(k)$ ($i=1,f; q=1,n$), and $c_{ijq}(k)$ ($i=1,g; q=1,m$), that correspond to the jth row of the matrices $A_i(k)$, $B_i(k)$ and $C_i(k)$, respectively, each such vector being defined as follows:

$$\theta_j(k) = [a_{1j1}(k), \ldots, a_{1jn}(k), a_{2j1}(k), \ldots, a_{2jn}(k), \ldots, a_{hjn}(k), \quad (42)$$
$$b_{1j1}(k), \ldots, b_{1jn}(k), b_{2j1}(k), \ldots, b_{2jn}(k), \ldots, a_{fjn}(k),$$
$$c_{1j1}(k), \ldots, c_{1jm}(k), c_{2j1}(k), \ldots, c_{2jm}(k), \ldots, c_{gpm}(k)]'$$

The vector $x(k)$, the components of which, $y_q(k-i-r_1)$ ($q=1,n; i=1,h$), $u_q(k-i-r)$ ($q=1,n; i=1,f$) and $w_q(k-i-r_2)$ ($q=1,m; i=1,g$) are the corresponding components of the vectors $y(k-i-r_1)$, $u(k-i-r)$ and $w(k-i-r_2)$, respectively, is defined by:

$$x(k) = [y_1(k-1-r_1), \ldots, y_n(k-1-r_1), \quad (43)$$
$$y_1(k-2-r_1), \ldots, y_n(k-2-r_1), \ldots, y_n(k-h-r_1),$$
$$u_1(k-1-r), \ldots, u_n(k-1-r),$$
$$u_1(k-2-r), \ldots, u_n(k-2-r), \ldots, u_n(k-f-r),$$
$$w_1(k-1-r_2), \ldots, w_m(k-1-r_2),$$
$$w_1(k-2-r_2), \ldots, w_m(k-2-r_2), \ldots, w_m(k-g-r_2)]'$$

Using the above notations, the more general adaptive law may be expressed as follows:

$$\theta_j(k) = D_j(k)\Psi_j(k)^2 \alpha'j(k)e_j(k)x(k) + \theta_j(k-1) \ (j=1,n) \quad (44)$$

wherein $D_j(k)$ are diagonal matrices, the diagonal terms of which are the coefficients $\beta_{aijq}(k)$, $\beta_{bijq}(k)$ and $\beta_{cijq}(k)$ previously considered in equations (9)–(15), $\Psi_j(k)$ are real gains, which can be conveniently chosen at each instant k, and $\alpha'j(k)$ can be defined by:

$$\alpha'j(k) = 1/[1 + \Psi_j(k)^2 x(k)'D_j(k)x(k)] (j=1, n) \quad (45)$$

A particular choice of the gains $\Psi_j(k)$ can be the following:

$$\Psi_j(k) = \sum_{i=1}^{\delta} \alpha_i e_j(k)^{\beta_i} \quad (46)$$

where $\alpha_i$ and $\beta_i$ ($i=1,\delta$) are real numbers and $\delta$ is an integer that can be conveniently chosen.

If $\Psi_j(k)$ ($j=1,n$) are chosen equal to 1, equations (44), (45) are equivalent to equations (9)–(15).

The adaptive law can be expressed even more generally if the vector $\theta_j(k)$ ($j=1,n$) is considered to include an integral term $\theta_{jI}(k)$ ($j=1,n$) and a proportional term $\theta_{jp}(k)$ ($j=1,n$). In such a case, the adaptive law may be expressed as follows:

$$\theta_j(k) = \theta_{jI}(k) + \theta_{jp}(k) (j=1,n) \quad (47)$$

wherein:

$$\theta_{jI}(k) = D_j(k)\Psi_j(k)^2 \alpha_{jI}(k)e_{jI}(k)x(k) + \theta_{jI}(k-1)(j=1,n) \quad (48)$$

$$\theta_{jp}(k) = \Psi_j(k)\Psi_j(k)^2 \alpha_{jI}(k)e_{jI}(k)x(k)(j=1,n) \quad (49)$$

wherein $D_j(k)$, $\Psi_j(k)$ and $x(k)$ are as defined above, $\Psi_j(k)$ are positive definite or semidefinite real matrices that can be conveniently chosen, and $e_{jI}(k)$ and $\alpha_{jI}(k)$ ($j=1,n$) can be respectively defined by:

$$e_{jI}(k) = y_j(k) - \theta_j(k-1)'x(k) \quad (50)$$

$$\alpha_{jI}(k) = 1/[1 + \Psi_j(k)^2 x(k)'(\Psi_j(k) + D_j(k))x(k)](j=1,n) \quad (51)$$

where $y_j(k)$ is the jth component of $y(k)$.

In the above description of the adaptive-predictive control system, the general adaptive law of the adaptive-predictive model parameters set forth in equations (8), (41)–(46) was based upon an estimated error vector $e(k)$, which vector was determined by comparing the estimated incremental process output vector $d(k)$ and the actual incremental process output vector $y(k)$. See equation (8). Alternatively, the estimated error vector $e(k)$ may be determined by comparing an estimation of any other output, control or measurable disturbance vector (which vectors are contained in the right-hand side of equation (2) with the actual value of that vector. In such a case, the adaptive-predictive model must be placed in a form that the vector $d(k)$ will be the estimation of the vector $y(k)$, but the estimation of the corresponding output, control or measurable disturbance vector considered. The error of this estimation will then be used to update the adaptive-predictive model.

By way of example, one particularly interesting manner of updating the parameters of the adaptive-predictive model is described in the following.

The control law (27) can also be written in the form:

$$u(k) = F_1(k) d_1(k + r + 1) + \quad (52)$$
$$\sum_{i=2}^{h+1} F_i(k) y(k + r + 2 - r_1 - i) +$$

-continued $$\sum_{i=1}^{f-1} H_i(k) u(k-i) + \sum_{i=1}^{g} T_i(k) w(k+r+1-r_2-i)$$

where:

$$F_1(k) = B_1(k)^{-1} \quad (53)$$

$$F_{i+1}(k) = -B_1(k)^{-1} A_i(k)(i=1,h) \quad (54)$$

$$H_{i-1}(k) = -B_1(k)^{-1} B_i(k)(i=2,f) \quad (55)$$

$$T_i(k) = -B_1(k) - 1 C_i(k)(i=1,g) \quad (56)$$

The updating of the adaptive-predictive model matrices $F_i(k)$ (i=1,h+1), $H_i(k)$ (i=1,f−1), and $T_i(k)$ (i=1,g) can be made through the updating of matrices $A_i(k)$ (i=1,h), $B_i(k)$ (i=1,f) and $C_i(k)$ (i=1,g), as has been defined by equations (42)–(46). Alternatively, the adaptive-predictive model matrices $F_i(k)$, $H_i(k)$ and $T_i(k)$ can be updated through equations (44)–(46), but in which the vectors e(k), $\theta_j(k)$ (j=1,n) and x(k) are redefined according to the following:

1. The vector d(k) will now be an estimation of the vector u(k−r−1), and it will be computed by the adaptive-predictive model as follows:

$$d(k) = F_1(k-1) y(k) + \sum_{i=2}^{h+1} F_i(k-1) y(k+1-i-r_1) + \quad (57)$$

$$\sum_{i=1}^{f-1} H_i(k-1) u(k-1-i-r) + \sum_{i=1}^{g} T_i(k-1) w(k-i-r_2)$$

Therefore, the identification error, e(k) will be in this case defined by:

$$e(k) = u(k-r-1) - d(k) \quad (58)$$

2. The vectors $\theta_j(k)$ (j=1,n) and x(k) will now be defined by:

$$\theta_j(k) = [f_{1jl}(k), \ldots f_{1jn}(k), f_{2jl}(k), \ldots, \quad (59)$$

$$f_{2jn}(k), \ldots f_{h+1jn}(k),$$

$$h_{1jl}(k), \ldots, h_{1jn}(k), h_{2jl}(k), \ldots, h_{2jn}(k), \ldots, h_{f-1jn}(k),$$

$$t_{1jl}(k), \ldots, t_{1jm}(k), t_{2jl}(k), \ldots, t_{2jm}(k), \ldots, t_{gjm}(k)]'$$

$$x(k) = [y_1(k), \ldots y_n(k), y_1(k-1-r_1), \ldots, \quad (60)$$

$$y_n(k-1-r_1), y_1(k-2-r_1), \ldots y_n(k-h-r_1)$$

$$u_1(k-2-r), \ldots, u_n(k-2-r), u_1,(k-3-r), \ldots,$$

$$u_n(k-f-r), w_1(k-1-r_2), \ldots, w_m(k-1-r_2), w_1,$$

$$(k-2-r_2), \ldots, w_m(k-g-r_2)]'$$

where the parameters $f_{ijq}(k)$ (i=1, h+1; q=1,n), $h_{ijq}(k)$ (i=1, f−1; q=1,n), and $t_{ijq}(k)$ (i=1,g; q=1,m), correspond to the jth row of the matrices $F_i(k)$, $H_i(k)$, and $T_i(k)$; and $y_q(k)$ (q=1,n), $y_q(k+1-i-r_1)$ (i=2, h+1; q=1,n), $u_q(k-1-i-r)$ (i=1, f−1; q=1,n) and $w_q(k-i-r_2)$ (i=1,g; q=1,n) are the corresponding components of the vectors y(k), y(k+1−i−r$_1$) (i=2, h+1), u(k−1−i−r) (i=1, f−1), and w(k−i−r$_2$) (i=1,g), respectively.

The diagonal terms of the diagonal matrices $D_j(k)$ (j=1,n) that appear in equations (44) and (45), correspond in this case to time-variant coefficients $\beta_{fijq}(k)$, $\beta_{hijq}(k)$ and $\beta_{tijq}(k)$. A particular choice of these coefficients is to make them proportional to the absolute values of the corresponding parameters $f_{ijq}(k)$, $h_{ijq}(k)$ and $t_{ijq}(k)$, as it was previously considered for coefficients $\beta_{aijq}(k)$, $\beta_{bijq}(k)$ and $\beta_{cijq}(k)$ in equation (13), (14) and (15).

Also, the adaptive-predictive model matrices $F_i(k)$ (i=1, h+1), $H_i(k)$ (i=1, f−1), and $T_i(k)$ (i=1,g) can be updated in accordance with equations (47)–(51), but in which the vectors $\theta_j(k)$ and x(k) are those defined in equations (59) and (60) and $e_{jl}(k)$ (j=1,n) are obtained by:

$$e_{jl}(k) = u_j(k-r-1) - \theta_{jl}(k-1)' x(k)(j=1,n) \quad (61)$$

where $u_j(k-r-1)$ is the jth component of the vector u(k−r−1).

Figure 4:
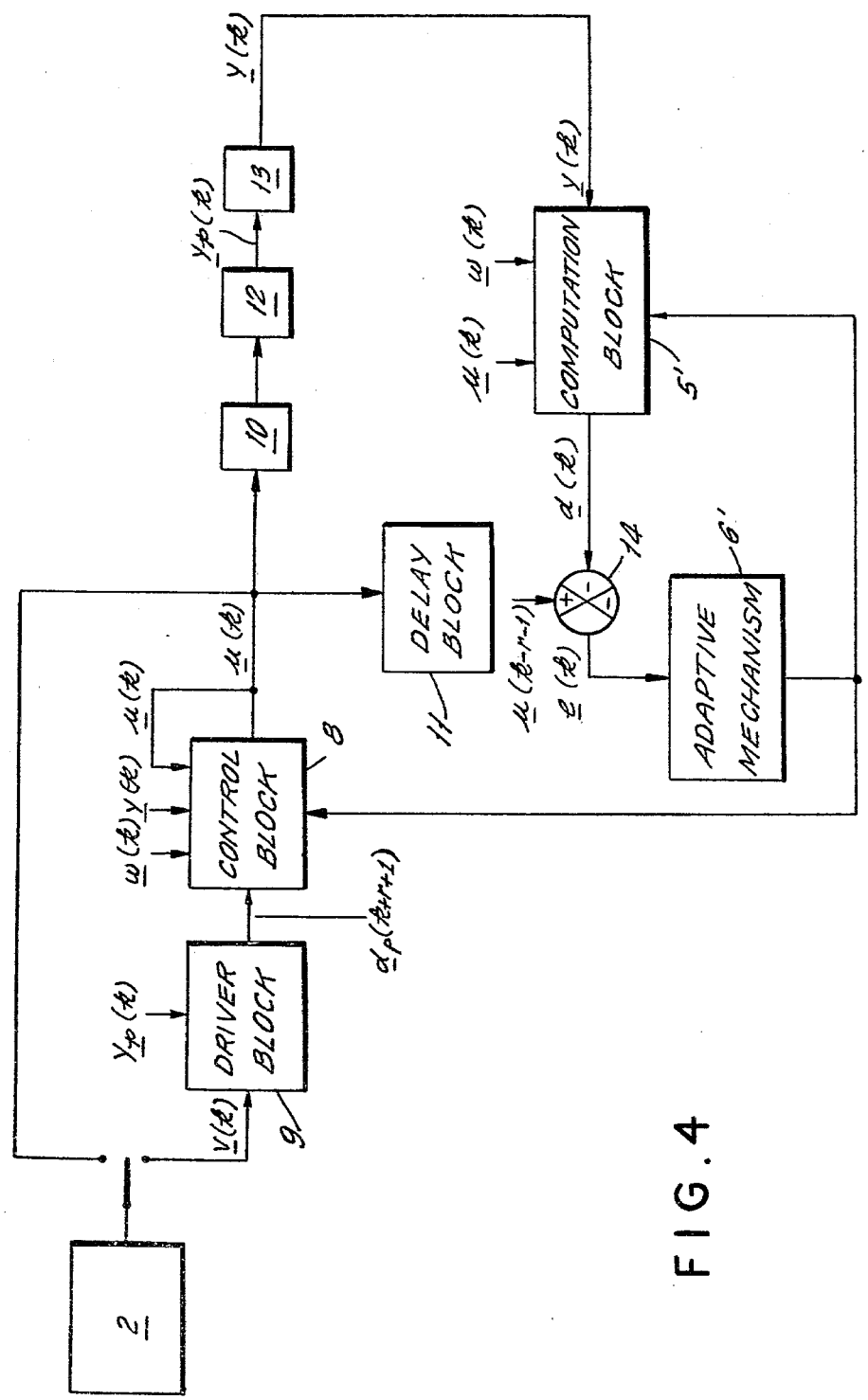
FIG. 4 shows a second embodiment of the adaptive-predictive control system of the present invention.

A block diagram illustrating the manner in which the adaptive-predictive control system would be modified in order to permit the updating of the parameters of the adaptive-predictive model in accordance with equations (44)–(46) and (57)–(60) is shown in FIG. 4. Such a system updates the parameters of the adaptive-predictive model by comparing an estimated control vector (indicative of the estimated value of the incremental control vector at a prior sampling instant (k−r−1)) with the actual value of the control vector at the same prior sampling instant (k−r−1).

Elements 2, 8, 9, 10, 12 and 13 of FIG. 4 are identical in operation to the corresponding elements of FIG. 1 and will not be described herein. The major difference between the embodiments of FIGS. 1 and 4 concerns the computational block 5' and the adaptive mechanism 6'. The computational block 5' of FIG. 4 generates an estimated incremental control vector d(k) in accordance with equation (57). This vector is applied to subtractor 14 which subtracts the vector d(k) from the measured value of the incremental control vector u(k) at sampling instant (k−r−1) to generate the error vector e(k) in accordance with equation (58). Incremental control vector u(k) is delayed in delay block 11 for r+1 sampling instants before being applied to subtractor 14.

The error vector e(k) generated by subtractor 14 is applied to adaptive mechanism 6' which updates the parameters of the adaptive-predictive model in computation block 5' and control block 8 in accordance with equations (44)–(46).

In some cases, an equivalent way of applying the control system presented here, is to decompose it to a set of single-output multi-input systems, each one of which will impose a condition to be verified by the components of the control vector at every sampling instant, and from the set of the n corresponding linear equations the control vector can be computed at every sampling instant.

Finally, the static gains of the process can be modified by multiplying the components of its output, input and disturbance vectors or incremental vectors by scalars gain; and also the dynamics of the process can be modified in an analogous way; in this case the control system will control the process through the control of the modified process.

EXPERIMENTAL EXAMPLE 1

Multivariable control of a binary distillation column.

The adaptive-predictive control system, previously described, has been implemented for the multivariable control of top and bottom compositions (in weight % of methanol) of a binary distillation column, at the Chemical Engineering Department, University of Alberta, Edmonton, Alberta, Canada).

Figure 2:
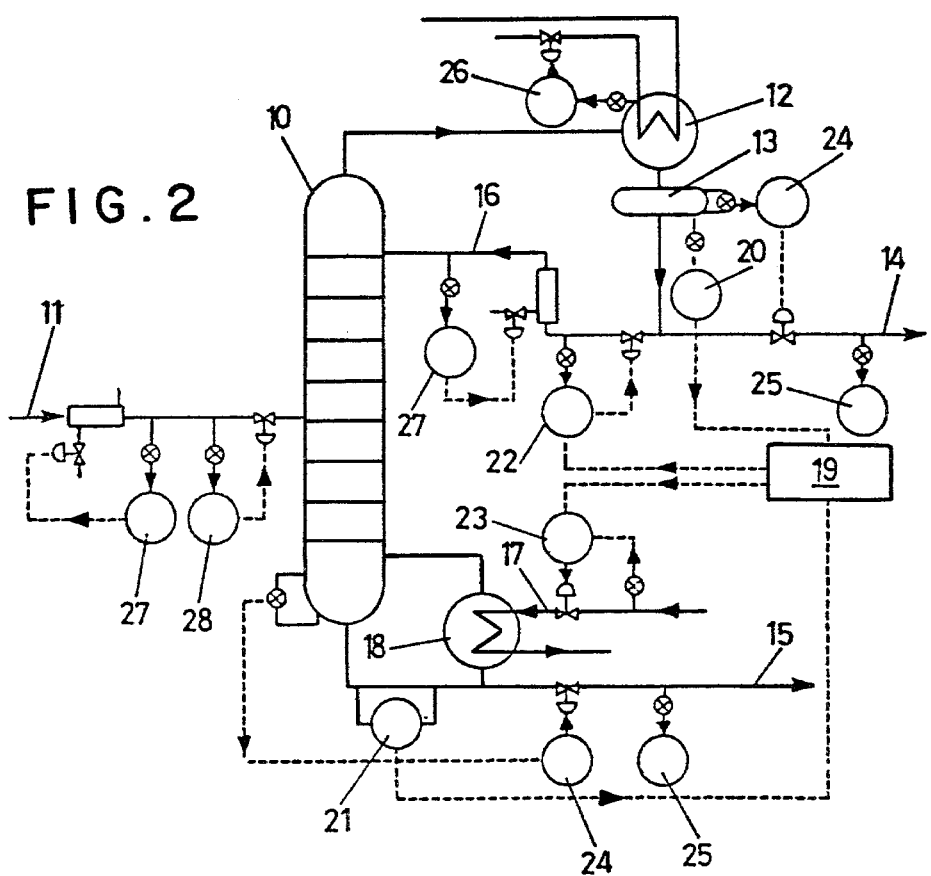
FIG. 2 shows a distillation column on which the adaptive-predictive control system was implemented to carry out a multivariable control of the top and bottom compositions as outputs with reflux and steam flow rates as inputs.

As shown in FIG. 2, the feed flow 11 enters into the distillation column 10 at the fourth ashtray, the top product condensates in 12 by cooling water, and falls to the container 13. The objective of the experiment is to control the composition of the bottom product 15, that goes away from the bottom of the column.

We have used as control variables, the reflux flow rate 16 and the steam flow rate 17, that heats the reboiler 18 in the bottom of the column. To accomplish the experiment we have used a digital computer 19, that takes the measurements of top and bottom compositions made by a composition recorder 20 and a gas chromatograph system 21, respectively, and that control the set point of the flow recorder controllers 22 and 23. In addition, the column had the following equipment: two liquid level indicator controllers 24, two flow recorders 25, a pressure indicator controller 26, two temperature recorder controllers 27 and a flow recorder controller 28.

The control variables were the reflux and the steam flow rates, and the sampling period was of 256 sec. Due to this large sampling period, there is no time delay between top composition and reflux and steam flow rates. There exists a measurement time delay of one sampling period between bottom composition and steam flow rate, because of the analysis time needed to measure the bottom composition, and the time delay between bottom composition and reflux rate was observed to be two sampling intervals. No significant disturbance was acting upon the process.

To avoid the problem of the singularity of $B_1(k)$, previously discussed, a sampling time delay was added to the top composition measurement; consequently, the corresponding component of the process output vector related to the top composition at the sampling instant k, is the measurement of the top composition at instant $k-1$; likewise, this component at instant $k+1$ is already known at instant k.

In accordance with the previously described circumstances, at every sampling instant k, the sequence of operations performed by the adaptive-predictive control system during its control action were:

1. Measurement of top and bottom compositions to obtain the process output vector y(k), the components of which are the top composition measured at $k-1$, $y_{p1}(k)$, and the bottom composition measured at k, $y_{p2}(k)$.

2. The number of sampling time delays considered for the process r is, in this case, equal to 1 and the integer $\gamma$ was chosen equal to 2, consequently the incremental output vector is computed by:

$$y(k) = y_p(k) - y_p(k-2) \qquad (62)$$

3. In the adaptive-predictive model, the integers h, f and $r_1$ were chosen equal to 3, 4 and 0, respectively, and no disturbance vector was considered; consequently, the estimated incremental output vector d(k) was computed by:

$$\begin{bmatrix} d_1(k) \\ d_2(k) \end{bmatrix} = \sum_{i=1}^{3} A_i(k-1) \begin{bmatrix} y_1(k-i) \\ y_2(k-i) \end{bmatrix} + \qquad (63)$$

$$\sum_{i=1}^{4} B_i(k-1) \begin{bmatrix} u_1(k-i-1) \\ u_2(k-i-1) \end{bmatrix}$$

where $d_1$ and $y_1$ are components related to the top composition; and $d_2$ and $y_2$ are the components related to the bottom composition. $u_1$ and $u_2$ are the incremental reflux and steam flow rates respectively. The incremental control vector $u(k-i-1)$ is obtained:

$$u(k-i-1) = u_p(k-i-1) - u_p(k-i-3) \qquad (64)$$

wherein $u_p(k-i-1)$ is the control vector applied at instant $k-i-1$. The matrices $A_i(k-1)$ (i=1, 3) and $B_i(k-1)$ (i=1,4) were chosen being:

$$A_1(k-1) = \begin{bmatrix} a_{111}(k-1) & 0 \\ 0 & 0 \end{bmatrix};$$

$$A_2(k-1) = \begin{bmatrix} a_{211}(k-1) & 0 \\ 0 & a_{222}(k-1) \end{bmatrix}$$

$$A_3(k-1) = \begin{bmatrix} 0 & 0 \\ 0 & a_{322}(k-1) \end{bmatrix}$$

$$B_1(k-1) = \begin{bmatrix} b_{111}(k-1) & b_{112}(k-1) \\ 0 & b_{122}(k-1) \end{bmatrix};$$

$$B_2(k-1) = \begin{bmatrix} b_{211}(k-1) & b_{212}(k-1) \\ b_{221}(k-1) & b_{222}(k-1) \end{bmatrix}$$

$$B_3(k-1) = \begin{bmatrix} 0 & 0 \\ b_{321}(k-1) & b_{322}(k-1) \end{bmatrix};$$

$$B_4(k-1) = \begin{bmatrix} 0 & 0 \\ b_{421}(k-1) & 0 \end{bmatrix}$$

4. Computation of the estimation error vector as indicated in equation (8).

5. Computation of the updated values at instant k of the parameters of the matrices $A_i(k)$ (i=1, 3) and $B_i(k)$ (i=1, 4), according to the equations (9), (10) and (12), taking into account that no disturbances were considered and that the value of the coefficients of $\beta$ corresponding to the non-zero parameters in the top and bottom rows were set to 1 and 0.1, respectively, and the $\beta$'s corresponding to remaining zero parameters in both the rows were set equal 0.

6. The components of the desired process output vector $d_p(k+2)$ at instant $k+2$, $d_{p1}(k+2)$, related to top and bottom compositions, respectively, are computed by the following scalar equations, that are a particular case of the equation 16:

$$d_{p1}(k+2) = \sum_{i=1}^{2} f_{1i} y_1(k+2-i) + \sum_{i=1}^{2} h_{1i} v_1(k+1-i) \qquad (65)$$

$$d_{p2}(k+2) = \sum_{i=1}^{2} f_{2i} y_2(k+1-i) + \sum_{i+1}^{3} h_{2i} v_2(k+1-i) \qquad (66)$$

where $v_1(k+1-i)$ and $v_2(k+1-i)$ are the components related to the top and bottom compositions, respectively, of the driver block input vector $v(k+1-i)$ at instant (k+1−i). The parameters of equations (65) and (66) were chosen equal to those of a second order model, without and with a sampling time delay respectively, a natural frequency of 0.0056 rad/sec, a damping ratio and static gain equal to 1. Given that the value of the previously mentioned static gain is unity, the components $v_1(k+1-i)$ and $v_2(k+1-i)$ have the physical meaning of being the setpoint values for top and bottom compositions, respectively, at instant k+1−i.

In equation (65) the value $y_1(k+1)$ was previously computed by:

$$y_1(k+1) = y_{p1}(k+1) - y_{p1}(k-1) \tag{67}$$

Note that $y_{p1}(k+1)$ is the value of the top composition measured at instant k.

From $d_p(k+2)$, the desired incremental process output vector $d_1(k°2)$ is computed by:

$$d_1(k+2) = d_p(k+2) - y_p(k) \tag{68}$$

The components of $d_1(k+2)$, $d_{11}(k+2)$ and $d_{12}(k+2)$, related to the top and bottom compositions, were limited to the absolute values of 0.3 and 0.6%, respectively.

7. Computation of the control vector by:

$$u(k) = B_1(k)^{-1} d_1(k+2) - B_1(k)^{-1} \sum_{i=2}^{4} B_i(k) u(k+1-i) - B_1(k)^{-1} \sum_{i=1}^{3} A_i(k) y(k+2-i) \tag{69}$$

$$u_p(k) = u(k) + u_p(k-2) \tag{70}$$

8. The absolute and the incremental value of $u_p(k)$ was limit checked before being applied to the process.

Figure 3:
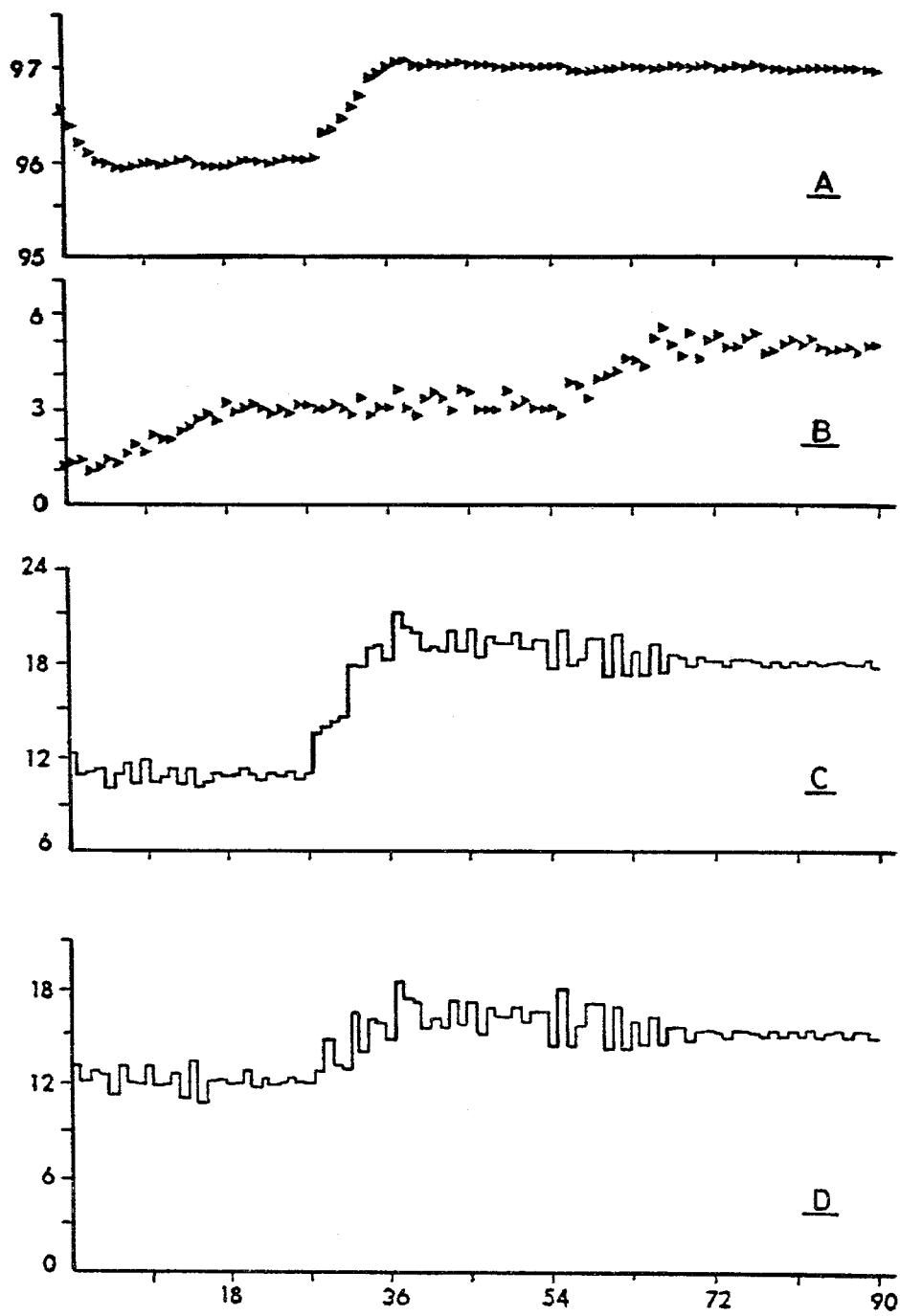
FIG. 3 shows results of one such experiment on the adaptive-predictive control of a distillation column.

FIG. 3 shows, from the beginning of the control action, the results of a 6 hrs. 24 min. experiment in which the distillation column was controlled by the adaptive-predictive control system.

In FIG. 3, the diagrams A, B, C and D represent, in the Y-axis, the top composition (%), the bottom composition (%), the reflux flow rate (g/s) and the stream flow rate (g/s), respectively, and in the X-axis the time in sampling instants.

The initial values of the parameters of the adaptive-predictive model were rationally chosen, and the control system performed in its identification mode for two sampling instants before starting the control action. When the control actions starts, the control system drives the process top and bottom compositions from 96.5 and 1% to 96 and 3%, respectively. Later on, at the instant 29, while the bottom composition is held at 3%, the top composition is driven to 97%, and at the instant 55, the bottom composition is driven from 3 to 5% and the top composition is held at 97%.

Note that the multivariable control problem of a binary distillation column, that the adaptive-predictive control system has solved commendably, has been for a long time an often cited example of difficulties in interacting multivariable chemical processes.

EXPERIMENTAL EXAMPLE 2

Control of a single-input single-output simulated process with an unstable inverse.

The adaptive-predictive control system, previously described, has been implemented for the control of a simulated single-input single-output process, the inverse of which is unstable. When the sampling period is chosen equal to 25 sec., the dynamic behavior of said simulated process is defined by the equation:

$$y_t(k) = 0.97512 y_t(k-1) - 0.24708 y_t(k-2) + 0.01426 y_t(k-3) + 0.09465 u_t(k-1) + 0.15042 u_t(k-2) + 0.01262 u_t(k-3) \tag{71}$$

Where $y_t(k)$ and $u_t(k-1)$ are the true output and input of the process at instants k and k−1, respectively. This process takes approximately 250 sec. to reach a steady-state output in response to a step input.

The simulation considers the measured process output $y_p(k)$ computed according to:

$$y_p(k) = y_t(k) + n_y(k) \tag{72}$$

where $n_y(k)$ is a gaussian noise of zero mean and standard deviation 5.

The true process input $u_t(k)$ is considered equal to the control $u_p(k)$, but when a non-measurable disturbance is considered, then:

$$u_t(k) = u_p(k) + n^u \tag{73}$$

where $n_u$ is the considered non-measurable disturbance.

In this implementation of the adaptive-predictive control system, at every sampling instant k, the desired output trajectory was selected to minimize an index such as the third index considered in operation (f) supra. Also, the incremental control u(k) was explicitly computed from the desired incremental output $d_1(k+r+1+\lambda)$, with $\lambda=1$, instead of the desired incremental output $d_1(k+r+1)$.

According to the previously described circumstances, at every sampling instant k, the sequence of operations performed by the adaptive-predictive control system during its control action were:

1. Measurement of the process output $y_p(k)$, according to equation (72).

2. Given that the number of sampling time delays considered for the process r is, in this case, equal to 0, and the integer $\lambda$ was chosen equal to 1, the integer $\gamma$ was chosen equal to 2. Consequently, the incremental process output was computed by:

$$y(k) = y_p(k) - y_p(k-2) \tag{74}$$

3. In the adaptive-predictive model, the integers h, f and $r_1$ were chosen equal to 2, 3 and 1, respectively, and no measurable disturbance was considered. Consequently, the estimated incremental process output d(k) was computed by:

$$d(k) = \sum_{i=1}^{2} a_i(k-1) y(k-1-i) + \sum_{i=1}^{3} b_i(k-1) u(k-i) \tag{75}$$

where the incremental control $u(k-i)$ is obtained by:

$$u(k-i) = u_p(k-i) - u_p(k-i-2) \tag{76}$$

4. Computation of the estimation error vector as indicated in equation 8.

5. Computation of the updated values at instant k of the parameters $a_i(k)(i=1, 2)$ and $b_i(k)(i=1, 3)$, according to the single-input single-output case of equations (9), (10) and (12), taking into account that no disturbances were considered and that the value of the coefficients $\beta_{ai}(k)$ and $\beta_{bi}(k)$ were set equal to 0.0125 and 0.0025, respectively.

6. The desired process output $d_p(k+r+1+\lambda)$ became in this case $d_p(k+2)$, given that $r=0$ and $\lambda=1$, and was computed by:

$$d_p(k+2)=0.19514y(k)-0.055-\\68y(k-1)+0.26547v(k)+0.33215v(k-1)+0.2077-\\3v(k-2) \quad (77)$$

where $v(k)$ is the setpoint or driver block input at instant k, and the parameters of equation (77) were chosen equal to those of a second order model with a sampling time delay, a time constant of 25 sec., a damping ratio and static gain equal to 1.

From $d_p(k+2)$ the desired incremental process output $d_1(k+2)$ is computed by:

$$d_1(k+2)=d_p(k+2)-y_p(k) \quad (78)$$

7. Computation of the control vector by:

$$u(k) = \left[ d_1(k+2) - \sum_{i=1}^{2} a_i(k) y(k+1-i) - \right.$$

$$b_1(k)(u_p(k-2) - u_p(k-1)) -$$

$$\left. b_3(k) u(k-1) \right] / [b_1(k) + b_2(k)] \quad (79)$$

$$u_p(k) = u(k) + u_p(k-2) \quad (80)$$

8. Before being applied to the process, the value of the control $u_p(k)$ was limited between 1,000 and 0, while the absolute value of the incremental control $u(k)$ was limited to 100, although this incremental limit was progressively decreased until 2 when the process output $y(k)$ approached the setpoint $v(k)$.

Figure 5:
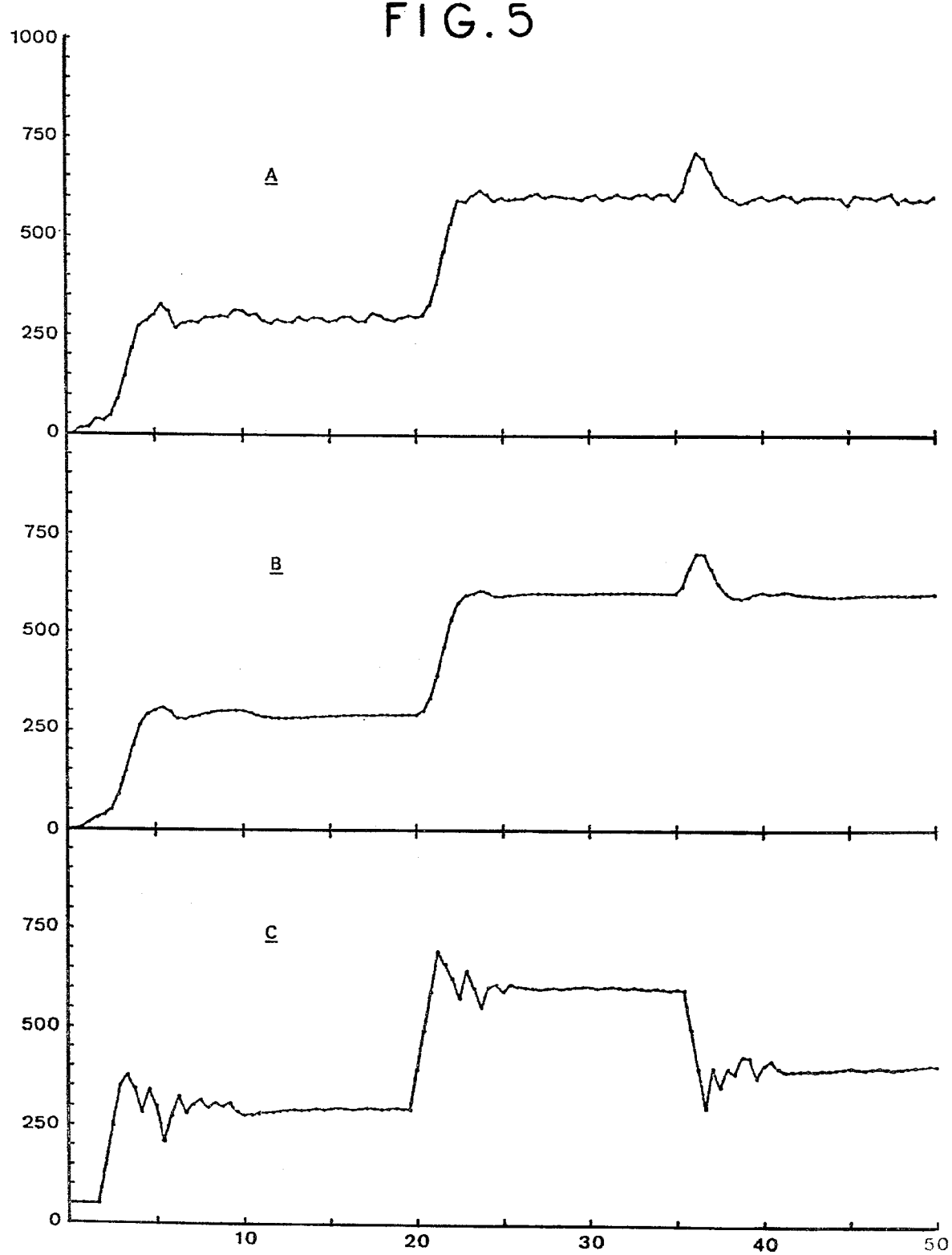
FIG. 5 shows results of an experiment on the adaptive-predictive control of a single-input single-output process with an unstable inverse.

FIG. 5 shows the results of a 50 min. experiment in which the simulated process was controlled by the adaptive-predictive control system. The sampling period was 25 sec.

In FIG. 5, the diagrams A, B and C represent, in the y-axis, the process output measurement $y_p(k)$, the true process output $y_t(k)$ and the control $u_p(k)$, respectively, and in the x-axis the time in minutes. The initial values of the parameters of the adaptive-predictive model were: $b_1(0)=0.1$, $b_2(0)=0.2$, $b_3(0)=0.1$, $a_1(0)=0.6$, $a_2(0)=-0.3$. The control system performed in its identification mode for four sampling instants before starting the control action. When the control action starts, the setpoint is 300. This setpoint is changed to 600 at minute 20, and at minute 35 a non-measurable disturbance equal to 200 acts on the process.

In summary, the adaptive-predictive control system described uses a digital computer to accomplish the adaptive control of single-input single-output or multivariable time-variant processes with known or unknown parameters and with or without time delays, in such a way that the dynamic output vector of the process is predicted and the control vector, to be applied to the process, is computed with the objective that the predicted dynamic output vector becomes equal to the desired dynamic process output vector and with the further objective that the desired dynamic output vector and the said control vector optimize a chosen performance criterion in which a future reference trajectory is explicitly considered, said reference trajectory being periodically redefined as a function of the previously measured process outputs and evolving according to desired dynamics to the setpoint.

SAMPLE PROGRAM

An adaptive-predictive control program capable of controlling single-input, single-output processes with time delays, and which is based in the minimization of an index such as the one considered in equation (20) supra is set forth in Table 1, infra. Consequently, this program is written in such a way that the predicted input sequence verifies conditions of equation (21) of the application, and the predicted output sequence verifies the condition of equation (22).

The variables of the program are classified and defined as follows:

Input-Output Variables:

These variables define the interaction between the APCS program and the process to be controlled and they are the following:

MEAS: Process output measurement. This is a program input corresponding to the vector $y_p(k)$.

SP: Setpoint or desired steady state value for the process output. This corresponds to vector $v(k)$ and is usually set by the human operator.

OUT: Input to be applied to the process. This is the program output when the control mode is performed, and a program input when the identification mode is performed. This input corresponds to the vector $u_p(k)$.

Structure Variables:

These variables give great flexibility to the control program, in the sense that through an adequate choice in each particular case, the control program can satisfactorily control a large variety of single-input single-output processes operating under very different conditions, simply by taking into account some obvious characteristics of each particular application. The choice of these variables can easily be made by the operator and they are:

IDENT: Integer equal to 1 when the identification mode is performed, and equal to zero when the control mode is performed.

PER: Sampling period.

CT: Desired time constant from which the driver block parameters are computed.

NR: Integer equal to the number of sampling periods (r in the above description) of time-delay of the process.

LND: Number of points of the predicted output and input sequences considered in the computation of the control signal, i.e. $\lambda+1$, supra.

MAP: Integer equal to the order of the adaptive-predictive model structure (corresponding to h and f in the foregoing description).

RM: Value approximately equal to or bigger than twice the standard deviation of the measurement noise acting on the process output.

CLICF: Physical incremental limit on the control signal.

LIMA, LIMI: Absolute limits on the control signal.

In most of the cases the previously considered structure variables will have a certain constant value, as the one shown in the program example set forth, and the operator will have only to set the sampling period, PER, and the time-delay, NR, for each particular application.

Other Variables of the Program:

Other variables used in the following program example are defined as follows:

IRTA: Integer equal to 0 at the first sampling instant and equal to 1 at the subsequent sampling instants. This variable permits an appropriate initialization of the program at the first sampling instant.

NFAD: Number of initial sampling instants required by the data acquisition before performing identification or control mode.

A( ), B( ) Adaptive-predictive model parameters.

ABP, BBP, CNST: Coefficients of the gradient parameter identification technique used in this example.

AC1, AC2 BC1, BC2: Driver block parameters.

SAL(K): Process output at the present sampling instant corresponding to $y_p(k)$ in the above description.

SAL(K+1): Process output as the sampling instant previous to the present one.

SAL(K-LND-NR): Value of the desired process output trajectory, LND+NR instants ahead of the present sampling instant, which is computed in the driver block. This value is equal to the value $d_p(k+r+1+\lambda)$ considered in equations (18A) and (23), supra.

SALI(K): Incremental process output at the present sampling instant, i.e. incremental value of the process output between the present sampling instant and the immediately previous one. This corresponds to $y(k)$ in the above description. Note that in this case integer $\gamma$ considered in equation (1), supra, is equal to (1).

SALI(K+I): Incremental process output at I previous sampling instants.

SALI(K−I): Value of the predicted incremental process output, I instants ahead of the present sampling instant, computed in the driver block assuming that the sequence of LND predicted incremental process inputs is composed of values, all of them equal to zero.

ENT(1): Process input at the present sampling instant corresponding to $u_p(k)$ in the above description.

ENT(2): Process input at the sampling instant previous to the present one.

ENTI(LND): Incremental process input at the present sampling period. This corresponds to the vector $u(k)$ in the above description.

ENTI(I) I>LND: Incremental process input at I−LND previous sampling instants.

ENTI(I) I<LND: Predicted incremental process input LND−I instants ahead of the present sampling instant. These values are always equal to zero to verify the conditions set forth in equation (21), supra.

Z(LND): Setpoint at the present sampling period corresponding to the vector $v(k)$ in the above description.

Z(I) I>LND: Setpoint at I−LND previous sampling instants.

Z(I) I<LND: Predicted setpoint LND−I instants ahead of the present sampling instant.

AD: Parameter which multiplied by ENTI(LND) determines the increment in the predicted process output, at LND+NR instants ahead of the present sampling instant, caused by a sequence of LND predicted process inputs verifying the conditions of equation (21) supra, and such that the incremental process input at the present sampling instant is equal to ENTI(LND).

DIN: Variable used at first to compute the desired output increment between the desired process output at LND+NR instants ahead of the present sampling instant and the present process output. Then, this variable is used to compute the control increment ENTI(LND) in such a way that the previously considered desired increment is equal to the corresponding predicted increment and therefore the condition of equation (23), supra, is verified.

DEV: Absolute value of the difference between the process output and the setpoint at the present sampling instant.

DEV1: Past value of DEV.

CLICA, CLICB, CLIMA, CLIMI, CLIS: Set of values which determines, from RM and DEV, the incremental control limit to be imposed to the control signal.

CLIDB, CLIDA: Values which determine from DEV the incremental limit to be imposed to the desired process output trajectory.

LIC: Incremental control limit.

LID: Incremental limit on the desired output trajectory.

INIT: Variable used to reinitialize the adaptive-predictive model parameters if AD becomes negative.

IK: Integer which indicates the number of sampling instants transpired since the first one. This integer is limited to 200.

IC: Integer which indicates the number of control instants transpired since the first one, and from which the value of LIC is made equal to 4 during the first four sampling instants. This integer is limited to 5.

As it can be seen, the program variables are classified in global and local variables. The global variables are those whose value must be kept in memory from one sampling instant to the following one.

In conclusion, the sample program set forth in the following Table 1 accomplishes the computation of the control signal through the verification of the conditions set forth in equations (21) and (22), supra, and consequently minimizing an index such as the one defined by equation (20), supra. Later on, the computed control signal is limit checked.

TABLE 1

```
&APCS7 T=00003 IS ON CR00135 USING 00010 BLKS R=0000

0001   C      ©COPYRIGHT       JUAN MARTIN SANCHEZ                    1980
0002          APCS PROGRAM(MEAS,SP,OUT)
0003          DIMENSION SAL(13),ENT(2),SALI(17),ENTI(16),Z(16),A(7),B(6),AB(5)
0004          DIMENSION BB(5), ADD(7)
0005          REAL LIMA,LIMI,LIC,LID,MEAS
0006   C
0007   C      GLOBAL AND LOCAL VARIABLE CLASSIFICATION
0008   C
0009   C      GLOBAL: PER,CT,NR,LND,MAP,RM,CLICA,CLICB,CLIMA,CLIMI,CLIS,
0010   C              CLIDB,CLIDA,AC1,AC2,BC1,BC2,K,CNST,IK,LIC,LIMA,CLICF,
0011   C              LIMI,IC,DEV
0012   C      LOCAL:  INIT,PERCT,ELE,I,IM,D,ER,ALPHA,DEV1,LID,AD,DIN
0013   C
0014          IF(IRTA.EQ. 1) GO TO 100
0015   C
0016   C      APCS PROGRAM INITIALIZATION
0017   C
0018   C      STRUCTURE VARIABLES INITIALIZATION
0019   C
0020          PER=1
0021          CT=1.5
0022          NR=0
0023          LND=5
0024          MAP=2
0025          RM=1.
0026          IDENT=0
0027          CLICF=50.
0028          LIMA=100.
0029          LIMI=0.
0030   C
0031   C      AP MODEL PARAMETERS INITIALIZATION
0032   C
0033          INIT=0
0034        3 B(1)=.1
0035          B(2)=.08
0036          B(3)=.1
0037          B(4)=.05
0038          B(5)=.02
0039          A(1)=1.
0040          A(2)=-.2
0041          A(3)=.05
0042          A(4)=.0
0043          A(5)=.0
0044          DO 2 I=MAP+1, 6
0045          A(I)=0.
0046        2 B(I)=0.
0047          IF(INIT. EQ. 1) GO TO 41
0048   C
0049   C      DRIVER BLOCK PARAMETERS COMPUTATION
0050   C
0051          PERCT=PER/CT
0052          ELE=1.-PERCT+.5*PERCT**2-(PERCT**3/6)
0053          AC1=1.-ELE*(1.+PERCT)
0054          AC2=ELE*(ELE-1.+PERCT)
0055          BC1=-2.*ELE
0056          BC2=ELE**2
0057   C
0058   C      OTHER VARIABLES INITIALIZATION
0059   C
0060          CLICA=50.
0061          CLICB=.2
0062          CLIMA=2.
0063          CLIMI=1.
0064          CLIS=.8
0065          CLIDB=.2
0066          CLIDA=10.
0067          CNST=20.
0068          ABP=1.
```

```
0069            BBP=1.
0070            K=1+LND+NR
0071            NFAD=2+MAP+NR
0072            IK=0
0073            LIC=2.
0074            DO 9 I=1,LND
0075      9     ENTI(I)=0.
0076            LIMA=100.
0077            LIMI=0.
0078            IC=0
0079      C
0080      C     INITIALIZATION ENDS
0081      C
0082      C
0083     100    CONTINUE
0084      C
0085      C     DATA ACQUISITION
0086      C
0087            IK=IK+1
0088            SAL(K+1)=SAL(K)
0089            ENT(2)=ENT(1)
0090            DO 29 I=1,NR+MAP
0091            IM=LND+NR+MAP-I
0092            Z(IM+1)=Z(IM)
0093     29     ENTI(IM+1)=ENTI(IM)
0094            DO 14 I=1,MAP
0095            IM=K+MAP-I
0096     14     SALI(IM+1)=SALI(IM)
0097            SAL(K)=MEAS
0098            Z(LND)=SP
0099            SALI(K)=SAL(K)-SAL(K+1)
0100            IF(IK.LT.NFAD) GO TO 16
0101            IF(IDENT.EQ.0) GO TO 15
0102     16     ENT(1)=OUT
0103            ENTI(LND)=ENT(1)-ENT(2)
0104     15     IF(IK.LT.NFAD) GO TO 250
0105            IF(IK.GT.200) IK=200
0106      C
0107      C     DATA ACQUISITION ENDS
0108      C
0109      C     COMPUTATION OF THE DEVIATION
0110      C
0111            DEV1=DEV
0112            DEV=ABS(SAL(K)-Z(LND))
0113      C
0114      C     DECISION ON CARRYING OUT PARAMETER IDENTIFICATION
0115      C
0116            IF(DEV.LT.RM) GO TO 41
0117            IF(DEV1.LT.RM) GO TO 41
0118      C
0119      C     AP MODEL GRADIENT PARAMETER IDENTIFICATION
0120      C
0121            D=0
0122            DO 20 I=1,MAP
0123            D=B(I)*ENTI(LND+NR+I)+A(I)*SALI(K+I)+D
0124            AB(I)=ABP*ABS(A(I))
0125            BB(I)=BBP*ABS(B(I))
0126            IF(AB(I).LT.0.001) AB(I)=.001
0127     20     IF(BB(I).LT.0.001) BB(I)=.001
0128            ER=SALI(K)-D
0129            ALPHA=CNST
0130            DO 25 I=1,MAP
0131     25     ALPHA=ALPHA+BB(I)*ENTI(LND+NR+I)**2+AB(I)*SALI(K+1)**2
0132            DO 30 I=1,MAP
0133            B(I)=B(I)+BB(I)*ER*ENTI(LND+NR+I)/ALPHA
0134     30     A(I)=A(I)+AB(I)*ER*SALI(K+I)/ALPHA
0135     41     CONTINUE
0136      C
0137      C     AD PARAMETER COMPUTATION
0138      C
0139            AD=B(1)
0140            IF(LND.EQ.1) GO TO 37
0141            ADD(1)=B(1)
0142            DO 36 I=2,LND
```

```
0143            ADD(I)=0.
0144            DO 46 J=1, I-1
0145     46     ADD(I)=A(J)*ADD(I-J)+ADD(I)
0146            ADD(I)=ADD(I)+B(I)
0147     36     AD=AD+ADD(I)
0148     37  IF(IDENT.EQ.1) GO TO 250
0149            IC=IC+1
0150            INIT=0
0151  C
0152  C      AP MODEL PARAMETERS REINITIALIZATION
0153  C
0154            IF(AD.LT.0. ) INIT=1
0155            IF(INIT.EQ. 1) GO TO 3
0156  C
0157  C      COMPUTATION OF INCREMENTAL CONTROL AND DESIRED OUTPUT LIMITS
0158  C
0159            IF(DEV.LT.2*RM) GO TO 90
0160            LIC=CLICB*DEV+CLICA
0161            GO TO 150
0162     90     LIC=CLIS*LIC
0163            IF(LIC.LT.2.*RM) LIC=CLIMA
0164            IF(LIC.EQ.CLIMA.AND.DEV.LT.RM) LIC=CLIMI*DEV
0165            IF(LIC.EQ.CLIMA.AND.DEV1.LT.RM) LIC=CLIMI*DEV
0166     150    IF(IC.LT.5) LIC=4
0167            IF(IC.GT.5)IC=5
0168            IF(LIC.GT.CLICF) LIC=CLICF
0169            LID=CLIDB*DEV+CLIDA
0170  C
0171  C
0172  C      DRIVER BLOCK-DESIRED OUTPUT LND+NR INSTANTS AHEAD
0173  C
0174            DO 151 I=1,LND
0175     151    Z(I)=Z(LND)
0176            DO 153 I=1,LND+NR
0177            SAL(K-I)=AC1*Z(LND+NR+1-I)+AC2*Z(LND+NR+2-I)
0178     153    SAL(K-I)=SAL(K-I)-BC1*SAL(K+1-I)-BC2*SAL(K+2-I)
0179  C
0180  C      INCREMENTAL LIMITS ON THE DESIRED OUTPUT
0181  C
0182            DIN=SAL(K-LND-NR)-SAL(K)
0183            IF(DIN.GT.LID) DIN=LID
0184            IF(DIN.LT.-LID) DIN=-LID
0185  C
0186  C      CONTROL BLOCK-CONTROL SIGNAL COMPUTATION
0187  C
0188            ENTI(LND)=0.
0189            DO 155 I=1,LND+NR
0190            SALI(K-I)=0.
0191            DO 145 J=1,MAP
0192     145    SALI(K-I)=A(J)*SALI(K+J-I)+B(J)*ENTI(LND+J+NR-I)+SALI(K-I)
0193     155    DIN=DIN-SALI(K-I)
0194            ENTI(LND)=DIN/AD
0195            ENT(1)=ENT(2)+ENTI(LND)
0196  C
0197  C      LIMITS ON THE CONTROL SIGNAL
0198  C
0199            IF(ENT(1).GT.LIMA) ENT(1)=LIMA
0200            IF(ENT(1).LT.LIMI) ENT(1)=LIMI
0201            ENTI(LND)=ENT(1)-ENT(2)
0202            IF(ENTI(LND).GT.LIC) ENTI(LND)=LIC
0203            IF(ENTI(LND).LT.-LIC) ENTI(LND)=-LIC
0204            ENT(1)=ENT(2)+ENTI(LND)
0205     240    OUT=ENT(1)
0206     250    CONTINUE
0207            STOP
0208            END
0209  C      ©COPYRIGHT      JUAN MARTIN SANCHEZ            1980
```

The present invention may be embodied in other specific forms without departing from the spirit or essential attributes thereof and, accordingly, reference should be made to the appended claims, rather than to the foregoing specification as indicating the scope of the invention.

What is claimed is:

1. A method for generating a control vector during each of a plurality of sampling instants k, said control vector to be applied to an apparatus which carries out a process having at least one input variable and at least one output variable, at least one of said input variables defining a process input vector, said apparatus varying said process input vector in accordance with the value of said control vector, said method comprising the steps of:

(A) storing a model which is capable of predicting the trajectory of a dynamic process output vector, which vector is composed of at least one of said process output variables, between future sampling instants $k+r+1$ and $k+r+1+\lambda$, $\lambda$ being a positive integer, as a function of a future sequence of said control vectors between sampling instants k and $k+\lambda$;

(B) selecting, at each of said sampling instants k, a desired dynamic process output trajectory between sampling instants $k+r+1$ and $k+r+1+\lambda$, said desired dynamic process output trajectory being equal to that specific process output trajectory between sampling instants $k+r+1$ and $k+r+1+\lambda$, which said model predicts would be caused by a specific future sequence of control vectors between sampling instants k and $k+\lambda$, and such that said specific process output trajectory and said specific future control sequence optimize a chosen performance criterion defined by an index which includes a first set of weighting matrices corresponding to the set of dynamic process output vectors included in the process output trajectory predicted by said model and a second set of weighting matrices corresponding to the set of the control vectors included in the sequence of control vectors that said model predicts will cause said process output trajectory, said weighting matrices being selected such that said index may be minimized without requiring the solution of a Ricatti equation; and (C) generating, at each of said sampling instants k, that control vector which said model predicts will cause said dynamic process output vector at sampling instant $k+r+1$ to be equal to the value of said desired dynamic process output trajectory at said sampling instant $k+r+1$, such that said control vector is equal to the value at sampling instant k of said specific control vector sequence and thereby optimizes said chosen performance criterion.

2. The method of claim 1, further comprising the step of periodically updating the parameters of said model in such a manner that the difference between the actual dynamic process output vector at sampling instant $k+r+1$ and the dynamic process output vector which said model predicts would result at said sampling instant $k+r+1$ is reduced towards 0, said step of periodically updating the parameters of said model including the steps of:

(A) periodically generating, in accordance with said adaptive-predictive model as updated at a prior sampling instant, an estimation vector d(k) representative of either an output vector, a control vector or a measurable disturbance vector of said process being controlled at a given sampling instant;

(B) periodically generating an estimated error vector representative of the difference between said estimation vector at said given sampling instant and the actual value of the vector estimated by said estimation vector at said given sampling instant; and (C) periodically modifying the parameters of said model as a function of said estimated error vector.

3. The method of claim 2, wherein optimization of said chosen performance criterion is obtained by minimizing the value of said index, said index varying as a function of at least one of a reference trajectory of process output vectors, a setpoint of said process, previously measured process output and control vectors, constraints on the permissible value of said control vectors and any other parameter or variables that influence the control performance of said process.

4. The method of claim 3, wherein said index varies as a function of the difference between the values of the process output vector trajectory predicted by said adaptive-predictive model and the values of said reference trajectory and also as a function of the incremental values of the control vector sequence that said model predicts will generate said values of said process output vector trajectory.

5. The method of claim 4, wherein the minimization of said index is obtained when said future specific control sequence is assumed constant from instant k to instant $k+\lambda$.

6. The method of claims 2, 3, 4 or 5, further including the step of generating an incremental vector indicative of the difference between the actual value of said one of said control, output or measurable disturbance vectors at said given sampling instant and the actual value of said one of said control, output or measurable disturbance vectors at an earlier sampling instant; wherein said estimation vector is the value of said incremental vector estimated by said model as updated at said prior sampling instant; and wherein said step of generating an estimated error vector comprises the step of determining the difference between the value of said incremental vector and the value of said estimation vector.

7. The method of claim 6, wherein said step of generating said control vector includes the step of generating an incremental control vector, representative of the incremental variation in the input vector of said process, which said model predicts will cause an incremental variation in said dynamic process output vector such that said dynamic process output vector at said sampling instant $k+r+1$ will be equal to the value of said desired dynamic process output trajectory at said sampling instant $k+r+1$.

8. A system for generating a control vector during each of a plurality of sampling instants k, said control vector to be applied to an apparatus which carries out a process having at least one input variable and at least one output variable, at least one of said input variables defining a process input vector, said apparatus varying said process input vector in accordance with the value of said control vector, said system comprising:

(A) means for storing a model which is capable of predicting the trajectory of a dynamic process output vector, which vector is composed of at least one of said process output variables, between future sampling instants $k+r+1$ and $k+r+1+\lambda$, $\lambda$ being a positive integer, as a function of a future sequence of said control vector between sampling instants k and $k+\lambda$;

(B) means for selecting, at each of said sampling instants k, a desired dynamic process output trajectory between sampling instants $k+r+1$ and $k+r+1+\lambda$, said desired dynamic process output trajectory being equal to a specific process output trajectory between sampling instants $k+r+1$ and $k+r+1+\lambda$, that said model predicts would be caused by a specific future sequence of control vectors between sampling instants k and $k+\lambda$, and such that said specific process output trajectory and said specific future control sequence optimize a chosen performance criterion defined by an index which includes a first set of weighting matrices corresponding to the set of dynamic process output vectors included in the process output trajectory predicted by said model and a second set of weighting matrices corresponding to the set of the control vector included in the sequence of control vectors that said model predicts will cause said process output trajectory, said weighting matrices being selected such that said index may be minimized without requiring the solution of a Ricatti equation; and (C) means for generating, at each of said sampling instants k, that control vector which said model predicts will cause said dynamic process output vector at sampling instant $k+r+1$ to be equal to the value of said desired dynamic process output trajectory at said sampling instant $k+r+1$, such that said control vector is equal to the value at sampling instant k of said specific control vector sequence and thereby optimizes said chosen performance criterion.

9. The system of claim 8, further comprising:
means for periodically updating the parameters of said model in such a manner that the difference between the actual dynamic process output vector at sampling instant $k+r+1$ and the dynamic process output vector which said model predicts would result at said sampling instant $k+r+1$ is reduced toward zero, said updating means updating the parameters of said model by:

(A) periodically generating, in accordance with said adaptive-predictive model as updated at a prior sampling instant, an estimation vector d(k) representative of either an output vector, a control vector, or a measurable disturbance vector of said process being controlled at a given sampling instant;

(B) periodically generating an estimated error vector representative of the difference between said estimation vector at said given sampling instant and the actual value of said vector estimated by said estimation vector at said given sampling instant; and (C) periodically modifying the parameters of said model as a function of said estimated error vector.

10. The system of claim 9, wherein optimization of said chosen performance criterion is obtained by minimizing the value of said index, said index varying as a function of at least one of a reference trajectory of process output vectors, a setpoint of said process, previously measured process output and control vector sequences, constraints on the permissible value of said control vector and any other parameter or variables that influence the control performance of said process.

11. The system of claim 10, wherein said index varies as a function of the difference between the values of the process output vector trajectory predicted by said adaptive-predictive model and the values of said reference trajectory and is also a function of the incremental values of the control vector sequence that said adaptive-predictive model predicts will generate said values of said process output vector trajectory.

12. The system of claim 11, wherein the minimization of said index is obtained when said future specific control sequence is assumed constant from instant k to instant $k+\lambda$.

13. The system of claim 8, 9, 10, 11 or 12, further including means for generating an incremental vector indicative of the difference between the actual value of said one of said control, output or measurable disturbance vectors at said given sampling instant and the actual value of said one of said control, output or measurable disturbance vectors at an earlier sampling instant; and wherein:
said estimation vector is the value estimated by said model, as updated at said prior sampling instant, of said incremental vector; and
said means for periodically updating the parameters of said model generates said estimated error vector by determining the difference between the value of said incremental vector and the value of said estimation vector.

14. The system of claim 13, wherein said means for generating said control vector includes means for generating an incremental control vector representative of the incremental variation in the input vector of said process, which said model predicts will cause an incremental variation in said dynamic process output vector such that said dynamic process output vector at said sampling instant $k+r+1$ will be equal to the value of said desired dynamic process output trajectory at said sampling instant $k+r+1$.

15. The method of claim 3, wherein said reference trajectory is periodically redefined as a function of the previously measured process outputs and evolves according to desired dynamics to the setpoint.

16. The system of claim 10, wherein said reference trajectory is periodically redefined as a function of the previously measured process outputs and evolves according to desired dynamics to the setpoint.

17. The method of claim 1, wherein optimization of said chosen performance criterion is obtained by minimizing the value of said index, said index varying at the function of at least one of a reference trajectory of process output vectors, a setpoint of said process, previously measured process and control vectors, constraints on the permissible value of said control vectors and any other parameter or variables that influence the control performance of said process.

18. The method of claim 17, wherein said index varies as a function of the difference between the values of the process output vector trajectory predicted by said adaptive-predictive model and the values of said reference trajectory and also as a function of the incremental values of the control vector sequence that said adaptive-predictive model predicts will generate said values of said process output vector trajectory.

19. The method of claim 18, wherein the minimization of said index is obtained when said future specific control sequence is assumed constant from instant k to instant $k+\lambda$.

20. The method of claim 1, wherein at least one weighting matrix of said second set of weighting matrices is different than a second weighting matrix of said second set of weighting matrices.

* * * * *